(12) United States Patent
Gu et al.

(10) Patent No.: US 12,184,921 B2
(45) Date of Patent: Dec. 31, 2024

(54) CROSS-DEVICE CONTENT PROJECTION METHOD AND ELECTRONIC DEVICE

(71) Applicant: Honor Device Co., Ltd., Shenzhen (CN)

(72) Inventors: Hejin Gu, Shenzhen (CN); Shicong Liu, Shenzhen (CN); Siyue Niu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 5 days.

(21) Appl. No.: 17/760,166

(22) PCT Filed: Apr. 26, 2021

(86) PCT No.: PCT/CN2021/089771
§ 371 (c)(1),
(2) Date: Aug. 4, 2022

(87) PCT Pub. No.: WO2021/233079
PCT Pub. Date: Nov. 25, 2021

(65) Prior Publication Data
US 2023/0021994 A1    Jan. 26, 2023

(30) Foreign Application Priority Data

May 18, 2020   (CN) .......................... 202010420436.1

(51) Int. Cl.
| | |
|---|---|
| *H04N 21/258* | (2011.01) |
| *H04N 21/41* | (2011.01) |
| *H04N 21/422* | (2011.01) |
| *H04N 21/43* | (2011.01) |
| *H04N 21/4363* | (2011.01) |
| *H04N 21/442* | (2011.01) |

(52) U.S. Cl.
CPC ..... *H04N 21/4126* (2013.01); *H04N 21/4122* (2013.01); *H04N 21/43637* (2013.01)

(58) Field of Classification Search
None
See application file for complete search history.

(56) References Cited

U.S. PATENT DOCUMENTS

| | | | |
|---|---|---|---|
| 10,034,234 B2 | 7/2018 | Iwami et al. | |
| 10,757,109 B2* | 8/2020 | Thomas | ............ H04W 12/0471 |
| 2018/0176756 A1* | 6/2018 | Buscemi | .................. H04B 5/72 |
| 2019/0278468 A1* | 9/2019 | Tomono | ................ G06F 1/1698 |

(Continued)

FOREIGN PATENT DOCUMENTS

| | | |
|---|---|---|
| CN | 104410950 A | 3/2015 |
| CN | 104965632 A | 10/2015 |

(Continued)

*Primary Examiner* — Brian T Pendleton
*Assistant Examiner* — Jean D Saint Cyr
(74) *Attorney, Agent, or Firm* — Slater Matsil, LLP

(57) ABSTRACT

A content projection method and device related to the field of screen projection technologies are provided. The method includes: The third electronic device plays second content; an NFC chip of the third electronic device touches or approaches an NFC chip of the first electronic device; the third electronic device receives connection status information sent by the first electronic device; and the third electronic device projects the second content to the second electronic device based on the connection status information.

17 Claims, 26 Drawing Sheets

(56) References Cited

U.S. PATENT DOCUMENTS

| | | | |
|---|---|---|---|
| 2022/0014514 A1* | 1/2022 | Tate | .................... H04L 63/0838 |
| 2022/0291892 A1 | 9/2022 | Gu | |
| 2022/0353571 A1* | 11/2022 | Wang | ............... H04N 21/43637 |

FOREIGN PATENT DOCUMENTS

| CN | 106534547 A | 3/2017 |
|---|---|---|
| CN | 107690063 A | 2/2018 |
| CN | 110515576 A | 11/2019 |
| CN | 110958475 A | 4/2020 |
| EP | 3107347 A1 | 12/2016 |
| JP | 2016177132 A | 10/2016 |

* cited by examiner

Smart television (slave device)

Smart speaker 1 (slave device)

CROSS-DEVICE CONTENT PROJECTION METHOD AND ELECTRONIC DEVICE

CROSS-REFERENCE TO RELATED APPLICATIONS

This application is a national stage of International Application No. PCT/CN2021/089771, filed on Apr. 26, 2021, which claims priority to Chinese Patent Application No. 202010420436.1, filed on May 18, 2020. Both of the aforementioned applications are hereby incorporated by reference in their entireties.

TECHNICAL FIELD

This application relates to the field of screen projection technologies, and in particular, to a content projection method and an electronic device.

BACKGROUND

With the development of electronic technologies, a user can implement quick sharing of information or content through screen projection in daily life and work. When screen projection is required, the user inputs, on one device, identification information that is used for establishing a screen projection connection to another device, such as a screen projection code. After the two devices establish the screen projection connection, the user may send to-be-shared screen projection content that is stored on one device to the other device, and the other device displays the screen projection content. For example, scenarios such as enterprise meetings, teaching presentations, and group presentations may all involve such a screen projection process.

When a user wants to project screens of a plurality of devices to a same device, current operations generally require that a same application be installed on the plurality of devices and that each device undergo a process of "connecting to a same network>searching for devices>initiating a device connection request>confirming connection by a requested device". For example, to connect a mobile phone to a television in a wireless or wired manner, a user taps "Project screen" on the mobile phone to search for devices around and taps a target device in a list of search results to request a connection, and the target device confirms the connection. Then the connection is established. A device A and a device B need to both repeat that process to connect to a television C. However, the searching for devices around is slow and time-consuming. If a plurality of devices are found around, the list keeps refreshing, and unintended touches are apt to occur to result in connection to another device. Both the requesting device and the target device need to confirm the connection, involving cumbersome operations.

Some third-party software allows screen projection from a plurality of mobile phones to a computer but requires that the computer and the mobile phones all be installed with the same software and connected to the same Wi-Fi network environment, and that the plurality of mobile phones all go through the same screen projection steps. Some multi-screen projection solutions are also provided in conventional technology that allow projecting screens of mobile phones and screens of computers to a television simultaneously, so that a plurality of small screens can be simultaneously displayed on a large screen. However, operations need to be repeated on each mobile phone and computer to establish connections with the television. Such operations are comparatively complicated.

SUMMARY

Embodiments of this application provide a content projection method and device. After a first electronic device projects content to a second electronic device, a simple "one hop" operation of the first electronic device with a third electronic device allows the third electronic device and the second electronic device to quickly establish a connection for interaction. In addition, this solution further reduces waiting time for the third electronic device to search for the second electronic device for establishing a wireless connection, reduces unintentional connections caused by accidental touches, makes operations more accurate and more natural, and improves user experience.

According to a first aspect, an embodiment of this application provides a cross-device content projection method that is applied to a first electronic device, a second electronic device, and a third electronic device. The first electronic device, the second electronic device, and the third electronic device have an NFC chip each. The first electronic device plays first content, and the third electronic device plays second content. The method includes:
  projecting, by the first electronic device, the first content to the second electronic device;
  displaying, by the second electronic device, the first content;
  touching or approaching, by the NFC chip of the third electronic device, the NFC chip of the first electronic device;
  sending, by the first electronic device, connection status information of the first electronic device to the third electronic device;
  receiving, by the third electronic device, the connection status information;
  projecting, by the third electronic device, the second content to the second electronic device based on the connection status information; and
  displaying, by the second electronic device, the first content and the second content.

The NFC chip of the third electronic device touches or approaches the NFC chip of the first electronic device, so that a screen projection connection is quickly established between the third electronic device and the second electronic device. In other words, without using a screen projection application or third-party software, or approaching the second electronic device, the third electronic device can obtain the previous connection status information by touching or approaching the first electronic device, and then projects the content to the second electronic device. The foregoing screen projection operations are simple, unintentional connections are reduced, and user experience is improved.

In a possible implementation, after the NFC chip of the third electronic device touches or approaches the NFC chip of the first electronic device, the method further includes:
  receiving, by the third electronic device, a Bluetooth MAC address of the first electronic device through the NFC chip;
  establishing, by the third electronic device, a Bluetooth connection to the first electronic device based on the Bluetooth MAC address; and
  the receiving, by the third electronic device, connection status information sent by the first electronic device is specifically:

sending, by the first electronic device, connection status information of the first electronic device to the third electronic device by using the Bluetooth connection.

After the third electronic device touches or approaches the first electronic device, the Bluetooth connection is established between the third electronic device and the first electronic device for transmitting the connection status information. In this way, the complete connection status information cached in the first electronic device can be reliably and stably sent to the third electronic device. In particular, verification information used in the process of the screen projection connection between the first electronic device and the second electronic device is sent to the third electronic device by using Bluetooth, which helps avoid a verification process in the process of the screen projection connection between the third electronic device and the second electronic device, thereby accelerating establishment of the screen projection connection to the second electronic device.

In another possible implementation, the receiving, by the third electronic device, connection status information sent by the first electronic device and the receiving, by the third electronic device, the connection status information are specifically:

sending, by the first electronic device, the connection status information of the first electronic device to the third electronic device through the NFC chip; and receiving, by the third electronic device, the connection status information of the first electronic device through the NFC chip.

The connection status information is sent by using NFC, which can lower a requirement for a near field communication capability of the electronic device. In addition, the screen projection connection between the third electronic device and the second electronic device can be quickly established through a "one hop" operation.

In another possible implementation, the projecting, by the third electronic device, the second content to the second electronic device based on the connection status information specifically includes:

displaying, by the third electronic device, prompt information based on the connection status information, where the prompt information is used to provide an option for determining a projection policy;

receiving, by the third electronic device, an input operation performed on the prompt information; and in response to the input operation, projecting, by the third electronic device, the second content to the second electronic device according to a projection policy determined by a user.

The option for determining a projection policy is provided, so that the user is given the right to choose a projection policy when the third electronic device is about to perform screen projection to the second electronic device. In addition, capabilities of some peripherals of the second electronic device are also considered. For example, only one device can use a peripheral, such as a camera or a microphone, of the second electronic device at a time. In this case, the user is allowed to choose audio content or video content to be projected to the second electronic device, choose to use the camera of the second electronic device, or the like.

In another possible implementation, the second electronic device includes a television, and the projecting, by the third electronic device, the second content to the second electronic device according to a projection policy determined by a user is specifically:

projecting, by the third electronic device, display content and/or audio content in the second content to the television.

In this way, based on an actual projection requirement, the user can project only the display content to the television, project only the audio content to the television, or project the display content and the audio content together to the television.

In another possible implementation, the second electronic device includes a television and a speaker, and the projecting, by the third electronic device, the second content to the second electronic device according to a projection policy determined by a user is specifically:

projecting, by the third electronic device, display content in the second content to the television; and projecting, by the third electronic device, audio content in the second content to the speaker.

In this way, based on an actual projection requirement, the user can project the display content to the television and project the audio content to the speaker, to achieve better visual and auditory effects.

In another possible implementation, the connection status information includes information about the second electronic device.

In another possible implementation, the connection status information further includes verification information used for the first electronic device to project the first content to the second electronic device.

In this way, the third electronic device can quickly find the second electronic device and pass verification of the second electronic device, and thereby the screen projection connection is performed quickly.

According to a second aspect, an embodiment of this application provides a content projection method that is applied to a third electronic device. The third electronic device has an NFC chip, and the method includes:

playing, by the third electronic device, second content;

touching or approaching, by the NFC chip of the third electronic device, an NFC chip of a first electronic device, where the first electronic device is a device that has established a screen projection connection to a second electronic device;

receiving, by the third electronic device, connection status information sent by the first electronic device; and projecting, by the third electronic device, the second content to the second electronic device based on the connection status information.

The NFC chip of the third electronic device touches or approaches the NFC chip of the first electronic device, so that a screen projection connection is quickly established between the third electronic device and the second electronic device. In other words, without using a screen projection application or third-party software, or approaching the second electronic device, the third electronic device can obtain the previous connection status information by touching or approaching the first electronic device, and then projects the content to the second electronic device. The foregoing screen projection operations are simple, unintentional connections are reduced, and user experience is improved.

In a possible implementation, after the NFC chip of the third electronic device touches or approaches the NFC chip of the first electronic device, the method further includes:

receiving, by the third electronic device, a Bluetooth MAC address of the first electronic device through the NFC chip;

establishing, by the third electronic device, a Bluetooth connection to the first electronic device based on the Bluetooth MAC address; and the receiving, by the third electronic device, connection status information sent by the first electronic device is specifically:

receiving, by the third electronic device through the Bluetooth connection, the connection status information sent by the first electronic device.

After the third electronic device touches or approaches the first electronic device, the Bluetooth connection is established between the third electronic device and the first electronic device for transmitting the connection status information. In this way, the complete connection status information cached in the first electronic device can be reliably and stably sent to the third electronic device. In particular, verification information used in the process of the screen projection connection between the first electronic device and the second electronic device is sent to the third electronic device by using Bluetooth, which helps avoid a verification process in the process of the screen projection connection between the third electronic device and the second electronic device, thereby accelerating establishment of the screen projection connection to the second electronic device.

In another possible implementation, the receiving, by the third electronic device, connection status information sent by the first electronic device is specifically: receiving, by the third electronic device through the NFC chip, the connection status information sent by the first electronic device.

The connection status information is sent by using NFC, which can lower a requirement for a near field communication capability of the electronic device. In addition, the screen projection connection between the third electronic device and the second electronic device can be quickly established through a "one hop" operation.

In another possible implementation, the projecting, by the third electronic device, the second content to the second electronic device based on the connection status information specifically includes:

displaying, by the third electronic device, prompt information based on the connection status information, where the prompt information is used to provide an option for determining a projection policy;

receiving, by the third electronic device, an input operation performed on the prompt information; and in response to the input operation, projecting, by the third electronic device, the second content to the second electronic device according to a projection policy determined by a user.

The option for determining a projection policy is provided, so that the user is given the right to choose a projection policy when the third electronic device is about to perform screen projection to the second electronic device. In addition, capabilities of some peripherals of the second electronic device are also considered. For example, only one device can use a peripheral, such as a camera or a microphone, of the second electronic device at a time. In this case, the user is allowed to choose audio content or video content to be projected to the second electronic device, choose to use the camera of the second electronic device, or the like.

In another possible implementation, the second electronic device includes a television, and the projecting, by the third electronic device, the second content to the second electronic device according to a projection policy determined by a user is specifically:

projecting, by the third electronic device, display content and/or audio content in the second content to the television.

In this way, based on an actual projection requirement, the user can project only the display content to the television, project only the audio content to the television, or project the display content and the audio content together to the television.

In another possible implementation, the second electronic device includes a television and a speaker, and the projecting, by the third electronic device, the second content to the second electronic device according to a projection policy determined by a user is specifically:

projecting, by the third electronic device, display content in the second content to the television; and projecting, by the third electronic device, audio content in the second content to the speaker.

In this way, based on an actual projection requirement, the user can project the display content to the television and project the audio content to the speaker, to achieve better visual and auditory effects.

In another possible implementation, the connection status information includes information about the second electronic device.

In another possible implementation, the connection status information further includes verification information used for the first electronic device to project the first content to the second electronic device.

In this way, the third electronic device can quickly find the second electronic device and pass verification of the second electronic device, and thereby the screen projection connection is performed quickly.

According to a third aspect, an embodiment of this application provides an electronic device, including one or more processors and a memory, where code is stored in the memory. When the code is executed by the electronic device, the electronic device is caused to perform the method in the second aspect.

According to a fourth aspect, an embodiment of this application provides a computer storage medium, including computer instructions. When the computer instructions are run on an electronic device, the electronic device is caused to perform the method in the second aspect.

According to a fifth aspect, an embodiment of this application provides a computer program product. When the computer program product is run on a computer, the computer is caused to perform the method in the second aspect.

According to a sixth aspect, an embodiment of this application provides a content projection system, including a first electronic device, a second electronic device, and a third electronic device. The first electronic device, the second electronic device, and the third electronic device have an NFC chip each. The content projection system includes one or more processors and a memory, where code is stored in the memory. When the code is executed by the content projection system, the content projection system is caused to perform the method in the first aspect.

DETAILED DESCRIPTION OF ILLUSTRATIVE EMBODIMENTS

The following describes the technical solutions in the embodiments of this application with reference to the accompanying drawings in the embodiments of this application. In a description of the embodiments of this application, unless otherwise specified, "/" indicates an "or" relationship. For example, A/B may represent A or B. In this specification, "and/or" is merely an association relationship for describing associated objects, and represents that three relationships may exist. For example, A and/or B may represent the following three cases: only A, both A and B, and only B. In addition, in the description of the embodiments of this application, "a plurality of" means two or more than two.

The terms "first" and "second" in the following are merely used for a purpose of description, and shall not be understood as an indication or implication of relative importance or implicit indication of a quantity of indicated technical features. Therefore, a feature limited by "first" or "second" may explicitly or implicitly include one or more such features. In the description of the embodiments of this application, unless otherwise stated, "a plurality of" means two or more than two.

Figure 1:
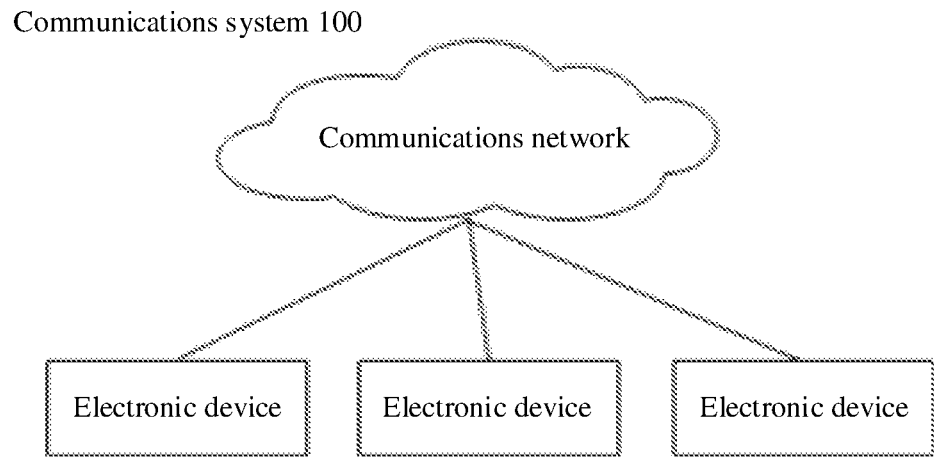
FIG. 1 is schematic architectural diagram 1 of a content projection system according to an embodiment of this application.

An embodiment of this application provides a cross-device content projection method that can be applied to a communications system (also referred to as a content projection system) wo shown in FIG. 1. As shown in FIG. 1, the communications system 100 may include N (N is an integer greater than 1) electronic devices. The N electronic devices may be interconnected through a communications network.

For example, the communications network may be a wired network or may be a wireless network. For example, the communications network may be a local area network (local area networks, LAN), or may be a wide area network (wide area networks, WAN), for example, the internet. The communications network may be implemented by using any known network communications protocol. The network communications protocol may be various wired or wireless communications protocols, such as ethernet, universal serial bus (universal serial bus, USB), firewire (FIREWIRE), global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TDSCDMA), long term evolution (long term evolution, LTE), Bluetooth, wireless fidelity (wireless fidelity, WiFi), NFC, voice over internet protocol (voice over Internet protocol, VoIP), a communications protocol supporting a network slicing architecture, or any other suitable communications protocol.

For example, in some embodiments, a Wi-Fi connection may be established between the electronic devices in the communications system wo based on the Wi-Fi protocol. In some other embodiments, the electronic devices in the communications system wo may be interconnected through one or more servers after login using a same account (for example, Huawei account).

Figure 2:
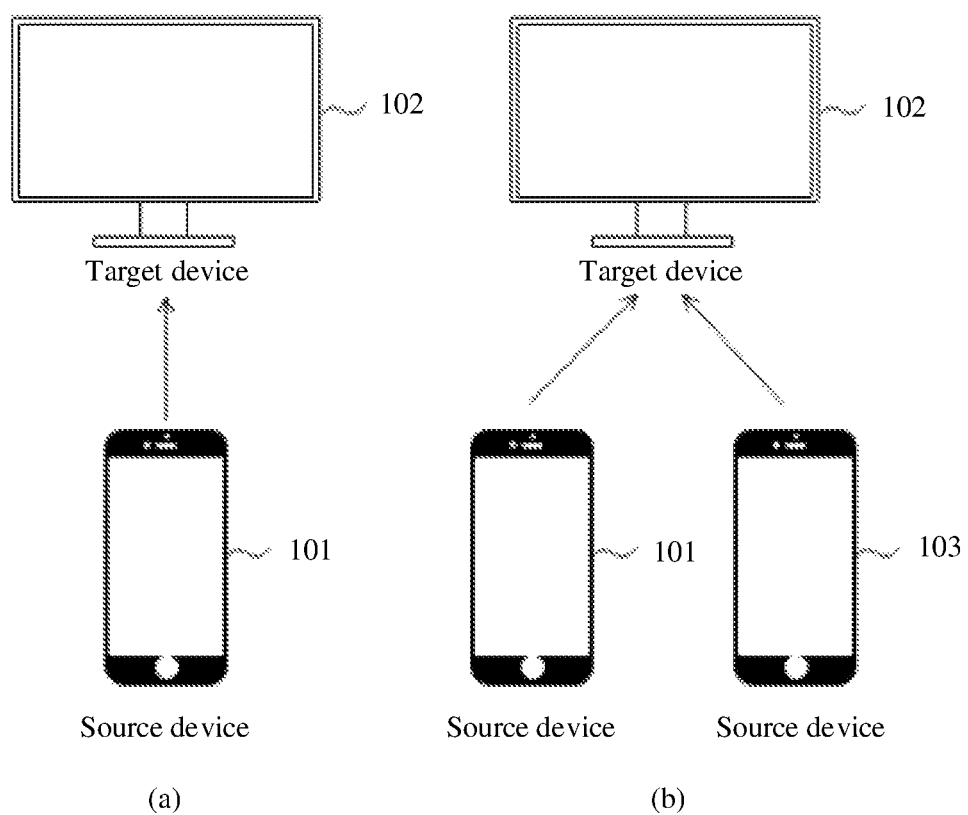
FIG. 2 is schematic architectural diagram 2 of a content projection system according to an embodiment of this application.

For example, the communications system 100 may include a first electronic device 101 and a second electronic device 102. For example, as shown in (a) of FIG. 2, the first electronic device 101 may serve as a source device, and the second electronic device 102 may serve as a target device of the first electronic device 101. The electronic device 101 may project content that is displayed or played by the first electronic device 101, to the second electronic device 102. In a subsequent embodiment, specific content that is projected by one electronic device to another electronic device may be referred to as projection content. For example, the projection content may include text, a picture, a video, audio, an animation, lighting effects, a web page, or the like.

In some embodiments, there may be a plurality of source devices. For example, the communications system 100 may further include a third electronic device 103 in addition to the first electronic device 101 and the second electronic device 102. As shown in (b) of FIG. 2, when the second electronic device 102 is the target device, both the first electronic device 101 and the third electronic device 103 may serve as the source devices of the second electronic device 102 and send projection content to the second electronic device 102. In this way, the first electronic device 101 and the third electronic device 103 may simultaneously project projection content of their own to the target device for displaying or playing. For example, a mobile phone A may project its presentation document to a television for playing, and at the same time, a mobile phone B may project a displayed video image to the television for displaying or playing.

In other words, a plurality of source devices in the communications system 100 may project projection content to one target device, thereby implementing cross-device interaction during content projection between a plurality of devices.

In this embodiment of this application, an electronic tag that is bound to one or more electronic devices may further be provided in the communications system 100. The electronic tag may also be referred to as a radio frequency tag or an RFID (radio frequency identification, radio frequency identification) tag. An electronic device may read information stored in the electronic tag by sending a radio frequency signal.

To facilitate understanding of those skilled in the art, a working principle of the electronic tag is introduced in this embodiment of this application.

For example, the electronic tag may include three implementation forms, that is, a passive tag, a semi-active tag, and an active tag. In this embodiment of this application, the electronic tag may be any one of a passive tag, a semi-active tag, or an active tag.

(1) Passive tag: When the electronic tag is a passive tag, there is no internal power supply in the electronic tag. When approaching an NFC (near field communication, near field communication) chip of another device, the electronic tag may receive electromagnetic wave information that is sent by the NFC chip of the another device. In this case, an internal integrated circuit (integrated circuit, IC) of the electronic tag is driven by a received electromagnetic wave signal. When receiving an electromagnetic wave signal of sufficient strength, the electronic tag may send data stored in the electronic tag to the NFC chip of the another device, for example, device information of a notebook computer.

(2) Semi-active tag: A working manner of a semi-active tag is similar to that of a passive tag. When the electronic tag is a semi-active tag, the electronic tag includes a small battery that supplies sufficient power to drive the internal IC of the electronic tag, so that the IC is in a working state. The semi-active tag includes the small battery. Therefore, the semi-active tag responds faster than the passive tag.

(3) Active tag: When the electronic tag is an active tag, the electronic tag includes an internal power supply that supplies power required by the internal IC to generate an external signal. Generally speaking, the active tag allows radio frequency communication over a longer distance, and the active tag has larger storage space that can be used to store data transmitted by an NFC chip of another device.

Figure 3:
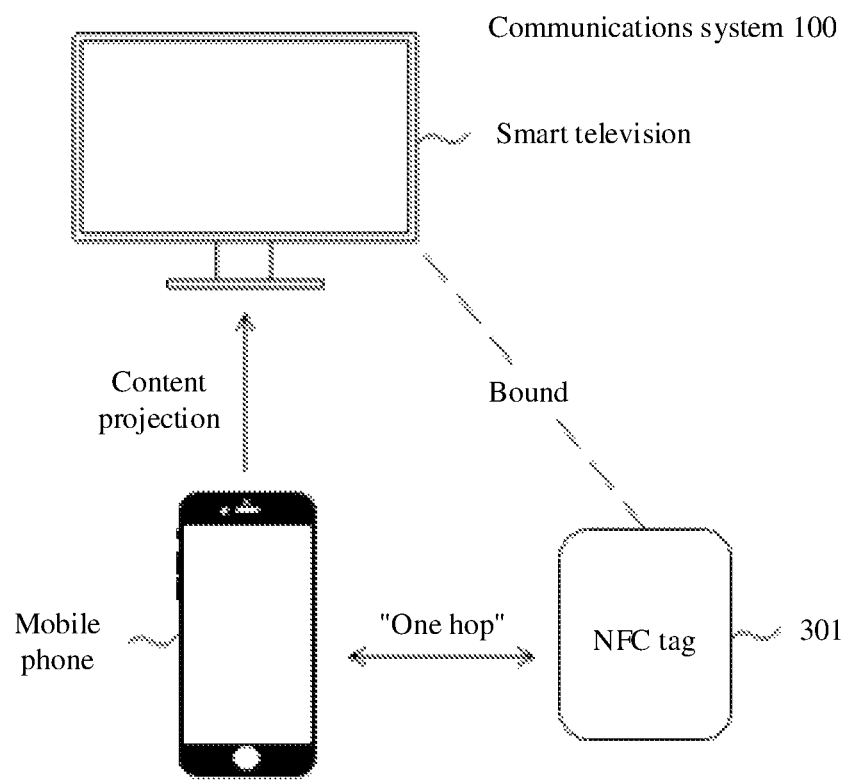
FIG. 3 is schematic architectural diagram 3 of a content projection system according to an embodiment of this application.

As shown in FIG. 3, the electronic tag may be specifically an NFC tag 301 (the NFC tag may also be referred to as an NFC patch) that is implemented by using an NFC technology. When an NFC chip of an electronic device (for example, a mobile phone) touches or approaches the NFC tag 301, the NFC chip of the mobile phone may detect an NFC signal sent by the NFC tag 301, and then may read, through the NFC signal, information stored in the NFC tag 301. In other words, the mobile phone may respond to a "one hop" operation of approaching or touching the NFC tag 301 and obtain, from the NFC tag 301, the information stored in the NFC tag 301.

For example, a coil is typically provided in the NFC tag 301, to store a binding relationship between the NFC tag 301 and one or more electronic devices. One electronic device may be bound to one or more NFC tags 301. For example, each NFC tag 301 is uniquely corresponding to one NFC card number. In this case, the NFC card number corresponding to the NFC tag 301 and an identifier of an electronic device A may be written to the coil of the NFC tag 301 in advance, so that a binding relationship between the NFC tag 301 and the electronic device A is established in the NFC tag 301.

It can be understood that a binding relationship stored in the NFC tag 301 may be preset before the NFC tag 301 is delivered, or may be manually set when a user uses (for example, uses for the first time) the NFC tag 301. This is not limited in this embodiment of this application.

Binding of the NFC tag 301 and a television (which may also be referred to as a smart television) in the communications system 100 is used as an example. Still as shown in FIG. 3, when the user needs to use content displayed or played by a source device (for example, the mobile phone) as projection content to be projected to the smart television (that is, a target device), the user may enable an NFC function of the mobile phone and make the mobile phone approach or touch the NFC tag 301. When a distance between the mobile phone and the NFC tag 301 is short enough, the mobile phone may read a binding relationship between the NFC tag 301 and the smart television from the NFC tag 301 by sending a near field communication signal. For example, the mobile phone may read an identifier of the smart television from the NFC tag 301. The identifier may be a MAC (media access control, media access control) address, a device name, an IPR address, or the like of the smart television.

In other words, by reading the binding relationship, the mobile phone may determine that the target device for this content projection is the smart television. In this case, the mobile phone as the source device may start to send this projection content to the smart television based on the read identifier of the smart television, so that the smart television may serve as the target device to display or play the projection content, thereby completing this content projection process.

The television (or the smart television) may be an analog television that uses an analog signal, may also be a digital television that uses a digital signal, and may further be any display output device that can play images, audio, or videos. In some scenarios, the television (or the smart television) may also be referred to as a smart-screen device or large-screen device.

Figure 4:
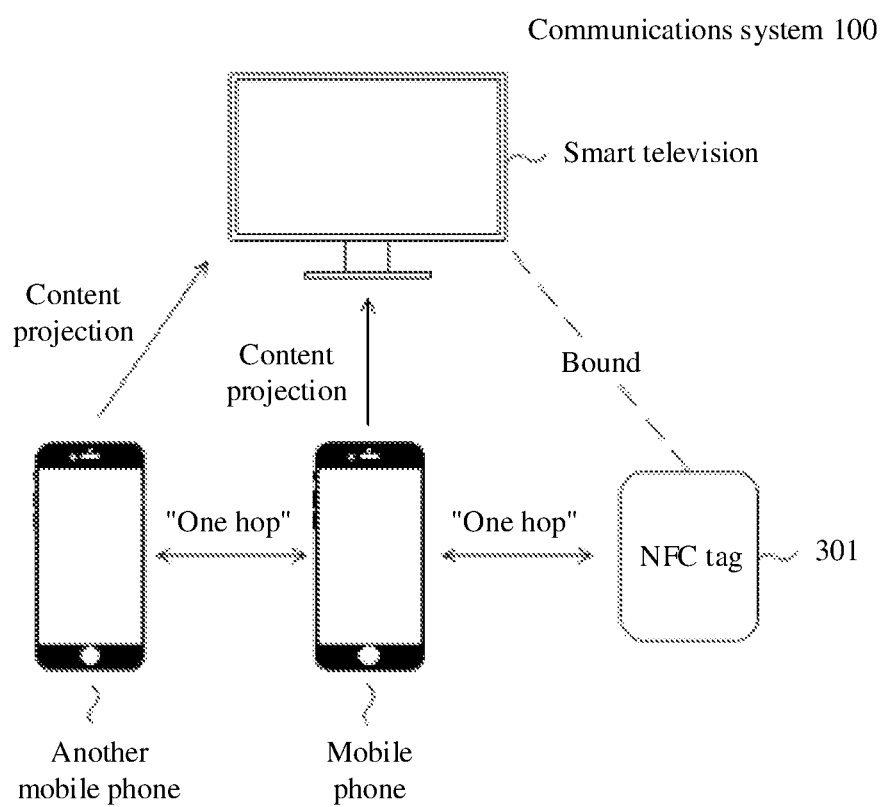
FIG. 4 is schematic architectural diagram 4 of a content projection system according to an embodiment of this application.

In some embodiments, when an NFC chip of an electronic device (for example, a mobile phone) touches or approaches the NFC tag 301, the NFC chip of the mobile phone not only reads the information stored in the NFC tag 301, but also can cache or store the read information in the mobile phone. In other words, the mobile phone may respond to a "one hop" operation of approaching or touching the NFC tag 301 and obtain the information stored in the NFC tag 301 from the NFC tag 301; and the mobile phone may further record a binding relationship between the NFC tag 301 and one or more electronic devices, an identifier of an electronic device, and device verification information. In this way, as shown in FIG. 4, another mobile phone may not need to approach or touch the NFC tag 301, and can read the binding relationship provided that the another mobile phone approaches or touches the mobile phone that has performed the "one hop" operation with the NFC tag 301. By reading the binding relationship, the another mobile phone may determine that a target device for this content projection is the smart television. In this case, the another mobile phone as a source device may start to send this projection content to the smart television based on the read identifier of the smart television, so that the smart television may serve as the target device to display or play the projection content, thereby completing this content projection process.

It can be learned that the user's using "one hop" of the source device with the NFC tag allows the source device to conveniently and quickly determine the target device for this content projection and therefore automatically start to project this projection content to the target device. In this way, an operation procedure of the user during cross-device content projection is simplified, user experience is improved and enriched, and working efficiency of collaboration between a plurality of devices during content projection is improved.

On a basis that one source device has established a content projection relationship with the target device through "one hop" of the source device with the NFC tag, another source device may perform "one hop" with the source device that has established a content projection relationship with the target device to allow the another source device to conveniently and quickly determine the target device for this content projection and therefore automatically start to project this projection content to the target device. In this way, an operation procedure of the user during cross-device content projection is simplified, user experience is improved and enriched, and working efficiency of collaboration between a plurality of devices during content projection is improved.

For example, the electronic device in the communications system 100 may be specifically a mobile phone, a tablet computer, a television, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or the like. This is not limited in the embodiments of this application.

Figure 5:
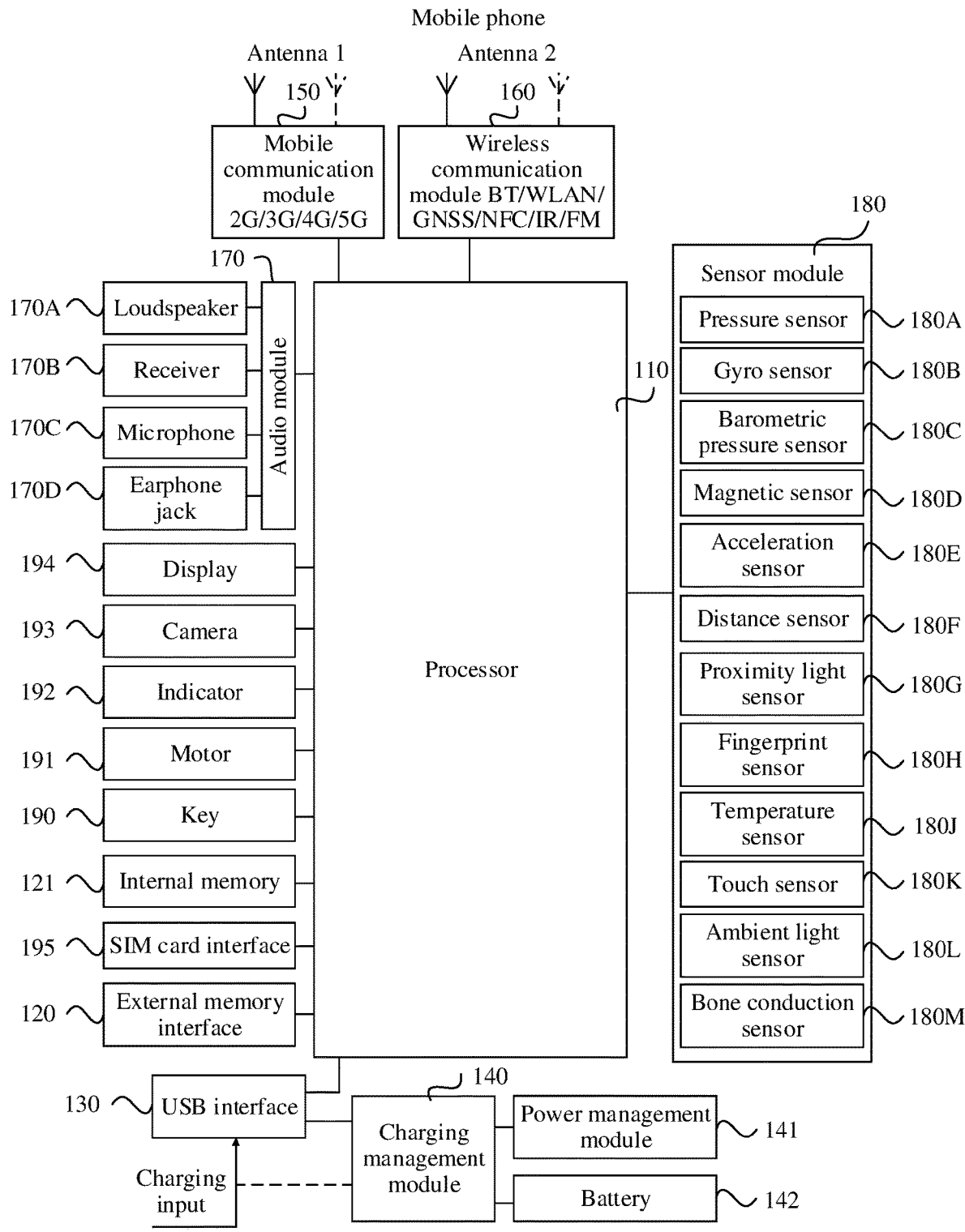
FIG. 5 is a schematic structural diagram of an electronic device according to an embodiment of this application.

An example is used in which the foregoing electronic device is a mobile phone. FIG. 5 is a schematic structural diagram of the mobile phone.

The mobile phone may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, an earphone jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It should be understood that a structure illustrated in this embodiment of this application does not constitute a specific limitation on the mobile phone. In some other embodiments of this application, the mobile phone may include components more or fewer than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural network processing unit (neural-network processing unit, NPU), and/or the like. Different processing units may be independent devices, or may be integrated into one or more processors.

The controller may generate an operation control signal according to an instruction operation code and a timing signal, to complete control of fetching an instruction and executing an instruction.

A memory may further be provided in the processor 110 for storing instructions and data. In some embodiments, the memory in the processor 110 is a cache. The cache may store an instruction or data that has just been used or cyclically used by the processor 110. If the processor 110 needs to use the instruction or data again, the instruction or data may be directly invoked from the cache, which avoids repeated access, reduces waiting time of the processor 110, and therefore improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a camera flash, the camera 193, and the like by using different I2C bus interfaces. For example, the processor 110 may be coupled to the touch sensor 180K by using an I2C interface, so that the processor 110 communicates with the touch sensor 180K by using the I2C bus interface, thereby implementing a touch function of the mobile phone.

The I2S interface may be used for audio communication. In some embodiments, the processor 110 may include a plurality of groups of I2S buses. The processor 110 may be coupled to the audio module 170 by using the I2S bus, thereby implementing communication between the processor 110 and the audio module 170. In some embodiments, the audio module 170 may transfer an audio signal to the wireless communication module 160 by using the I2S interface, thereby implementing a function of answering a call through a Bluetooth earphone.

The PCM interface may also be used for audio communication, sampling, quantizing, and encoding an analog signal. In some embodiments, the audio module 170 and the wireless communication module 160 may be coupled by using the PCM bus interface. In some embodiments, the audio module 170 may also transfer an audio signal to the wireless communication module 160 by using the PCM interface, thereby implementing the function of answering a call through the Bluetooth earphone. Both the I2S interface and the PCM interface may be used for audio communication.

The UART interface is a universal serial data bus used for asynchronous communication. The bus may be a bidirectional communications bus that converts to-be-transmitted data between serial communication and parallel communication. In some embodiments, the UART interface is usually configured to connect the processor 110 and the wireless communication module 160. For example, the processor 110 communicates with a Bluetooth module of the wireless communication module 160 by using the UART interface, thereby implementing a Bluetooth function. In some embodiments, the audio module 170 may transfer an audio signal to the wireless communication module 160 by using the UART interface, thereby implementing a function of playing music through the Bluetooth earphone.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 by using the CSI interface, thereby implementing a shooting function of the mobile phone. The processor 110 communicates with the display 194 by using the DSI interface, thereby implementing a display function of the mobile phone.

The GPIO interface may be configured by using software. The GPIO interface may be configured as a control signal, or may be configured as a data signal. In some embodiments, the GPIO interface may be configured to connect the processor 110 to the camera 193, the display 194, the wireless communication module 160, the audio module 170, the sensor module 180, and the like. The GPIO interface may also be configured as an I2C interface, an I2S interface, a UART interface, an MIPI interface, or the like.

The USB interface 130 is an interface that conforms to USB standard specifications, and may be specifically a Mini USB interface, a Micro USB interface, a USB Type C interface, or the like. The USB interface 130 may be configured to connect to a charger to charge the mobile phone, may be configured to transmit data between the mobile phone and a peripheral device, or may be configured to connect to an earphone to play audio through the earphone. The interface may be further configured to connect to another electronic device, for example, an AR device.

It may be understood that an interface connection relationship between the modules illustrated in the embodiments of this application is merely an example for description, and does not constitute a limitation on a structure of the mobile phone. In some other embodiments of this application, the mobile phone may alternatively use an interface connection manner different from those in the foregoing embodiments or a combination of a plurality of interface connection manners.

The charging management module 140 is configured to receive a charging input from a charger. The charger may be a wireless charger, or may be a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the mobile phone. When charging the battery 142, the charging management module 140 may further supply power to the electronic device by using the power management module 141.

The power management module 141 is configured to connect the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as battery capacity, battery cycle quantity, and battery health status (leakage and impedance). In some other embodiments, the power management module 141 may be provided in the processor 110. In some other embodiments, the power management module 141 and the charging management module 140 may be provided in a same device.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to send and receive an electromagnetic wave signal. Each antenna in the mobile phone may be configured to cover one or more communications frequency bands. In addition, different antennas may be multiplexed to improve utilization of the antennas. For example, the antenna 1 may be multiplexed into a diversity antenna used in a wireless local area network. In some other embodiments, the antenna may be used in combination with a tuning switch.

The mobile communication module 150 may provide a wireless communication solution that is applied to the mobile phone and that includes 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transfer the electromagnetic wave to the modem processor for demodulation. The mobile communication module 150 may also amplify a signal modulated by the modem processor, and convert the signal into an electromagnetic wave and radiate the electromagnetic wave out by using the antenna 1. In some embodiments, at least some functional modules of the mobile communication module 150 may be provided in the processor 110. In some embodiments, at least some functional modules of the mobile communication module 150 and at least some modules of the processor 110 may be provided in a same device.

The modem processor may include a modulator and a demodulator. The modulator is configured to modulate a low frequency baseband signal that is to be sent into a medium or high frequency signal. The demodulator is configured to demodulate a received electromagnetic wave signal into a low frequency baseband signal. Then, the demodulator sends the low frequency baseband signal obtained through demodulation to the baseband processor for processing. After being processed by the baseband processor, the low frequency baseband signal is transferred to the application processor. The application processor outputs a sound signal by using an audio device (not limited to the loudspeaker 170A, the receiver 170B, or the like), or displays an image or a video by using the display 194. In some embodiments, the modem processor may be an independent device. In some other embodiments, the modem processor may be separate from the processor 110 or provided in a same device with the mobile communication module 150 or another functional module.

The wireless communication module 160 may provide a wireless communication solution that is applied to the mobile phone and that includes wireless local area network (wireless local area networks, WLAN) (for example, a wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC) technology, infrared (infrared, IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may also receive a to-be-sent signal from the processor 110, perform frequency modulation and amplification on the signal, and convert the signal into an electromagnetic wave and radiate the electromagnetic wave out by using the antenna 2.

In some embodiments, in the mobile phone, the antenna 1 is coupled to the mobile communication module 150, and the antenna 2 is coupled to the wireless communication module 160, so that the mobile phone can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and/or satellite based augmentation systems (satellite based augmentation systems, SBAS).

The mobile phone implements a display function by using the GPU, the display 194, the application processor, and the like. The GPU is a microprocessor for image processing that is connected to the display 194 and the application processor. The GPU is configured to perform mathematical and geometric calculation for graphics rendering. The processor 110 may include one or more GPUs that execute program instructions to generate or change display information.

The display 194 is configured to display images, videos, and the like. The display 194 includes a display panel. The display panel may use a liquid crystal display (liquid crystal display, LCD), an organic light-emitting diode (organic light-emitting diode, OLED), an active-matrix organic light emitting diode or active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the mobile phone may include one or N displays 194, where N is a positive integer greater than 1.

The mobile phone may implement the shooting function by using the ISP, the camera 193, the video codec, the GPU, the display 194, the application processor, and the like.

The ISP is configured to process data fed back by the camera 193. For example, during photographing, a shutter is opened, light is transferred to a photosensitive element of the camera through a lens, an optical signal is converted into an electrical signal, and the photosensitive element of the camera transfers the electrical signal to the ISP for processing, so that the electrical signal is converted into an image visible to naked eyes. The ISP may also perform algorithm optimization on image noise, brightness, and skin color. The ISP may further optimize parameters such as exposure and color temperature of a shooting scenario. In some embodiments, the ISP may be provided in the camera 193.

The camera 193 is configured to capture a static image or a video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format, such as RGB or YUV. In some embodiments, the mobile phone may include one or N cameras 193, where N is a positive integer greater than 1.

The digital signal processor is configured to process a digital signal, and may process another digital signal in addition to a digital image signal. For example, when the mobile phone selects a frequency, the digital signal processor is configured to perform Fourier transform or the like on frequency energy.

The video codec is configured to compress or decompress a digital video. The mobile phone may support one or more types of video codecs. In this way, the mobile phone may play or record videos in a plurality of encoding formats, for example, moving picture experts group (moving picture experts group, MPEG)1, MPEG2, MPEG3, and MPEG4.

The NPU is a neural network (neural-network, NN) computing processor. By referring to a structure of a biological neural network, for example, referring to a mode of transmission between neurons in a human brain, the NPU quickly processes input information, and may further perform self-learning continuously. By using the NPU, an application such as intelligent cognition of the mobile phone may be implemented, for example, image recognition, face recognition, voice recognition, and text understanding.

The external memory interface 120 may be configured to connect to an external memory card, for example, a Micro SD card, to extend a storage capacity of the mobile phone. The external memory card communicates with the processor 110 through the external memory interface 120, thereby implementing a data storage function. For example, files such as music and a video are stored in the external memory card.

The internal memory 121 may be configured to store computer executable program code, and the executable program code includes instructions. The internal memory 121 may include a program storage area and a data storage area. The program storage area may store an operating system, an application program required by at least one function (such as a sound playing function or an image playing function), and the like. The data storage area may store data (such as audio data and a phone book) created when the mobile phone is used, and the like. In addition, the internal memory 121 may include a high-speed random access memory, and may further include a nonvolatile memory, for example, at least one magnetic disk storage device, a flash storage device, and a universal flash storage (universal flash storage, UFS). By running the instructions stored in the internal memory 121 and/or instructions stored in a memory that is provided in the processor, the processor 110 executes various functional applications and data processing of the mobile phone.

The mobile phone may implement an audio function, such as music playing and sound recording, by using the audio module 170, the loudspeaker 170A, the receiver 170B, the microphone 170C, the earphone jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be provided in the processor 110, or some functional modules of the audio module 170 are provided in the processor 110.

The loudspeaker 170A, also referred to as a "speaker", is configured to convert an audio electrical signal into a sound signal. A user may listen to music or answer a hands-free call by using the loudspeaker 170A of the mobile phone.

The receiver 170B, also referred to as an "earpiece", is configured to convert an audio electrical signal into a sound signal. When the mobile phone receives a call or a voice message, the user may listen to a speech by placing the receiver 170B close to an ear.

The microphone 170C, also referred to as a "microphone" or a "microphone", is configured to convert a sound signal into an electrical signal. When making a call or sending a voice message, the user may speak after moving the microphone 170C close to the mouth, to input a sound signal to the microphone 170C. At least one microphone 170C may be provided in the mobile phone. In some other embodiments, two microphones 170C may be provided in the mobile phone, and in addition to collecting a sound signal, a noise reduction function may be further implemented. In some other embodiments, three, four, or more microphones 170C may be alternatively provided in the mobile phone, to implement functions such as collecting a sound signal, reducing noise, identifying a sound source, and implementing a directional recording function.

The earphone jack 170D is configured to connect to a wired earphone. The earphone jack 170D may be the USB interface 130, or a 3.5 mm standard interface of the open mobile terminal platform (open mobile terminal platform, OMTP), or a standard interface of the cellular telecommunications industry association of the USA (cellular telecommunications industry association of the USA, CTIA).

The pressure sensor 180A is configured to sense a pressure signal, and may convert the pressure signal into an electrical signal. In some embodiments, the pressure sensor 180A may be provided in the display 194. There are many types of pressure sensors 180A, such as a resistive pressure sensor, an inductive pressure sensor, and a capacitive pressure sensor. The capacitive pressure sensor may include at least two parallel plates that include a conductive material. When force is applied to the pressure sensor 180A, a capacitance between electrodes changes. The mobile phone determines a pressure strength based on a change in the capacitance. When a touch operation is performed on the display 194, the mobile phone detects a touch operation strength by using the pressure sensor 180A. The mobile phone may also calculate a touch position based on a detection signal of the pressure sensor 180A. In some embodiments, touch operations that are performed on a same touch position but have different touch operation strengths may be corresponding to different operation instructions. For example, when a touch operation whose touch operation strength is less than a first pressure threshold is performed on a messaging application icon, an instruction to view a message is executed. When a touch operation whose touch operation strength is greater than or equal to the first pressure threshold is performed on the messaging application icon, an instruction to create a new message is executed.

The gyro sensor 180B may be configured to determine a motion posture of the mobile phone. In some embodiments, angular velocities of the mobile phone around three axes (that is, an x-axis, a y-axis, and a z-axis) may be determined by using the gyro sensor 180B. The gyro sensor 180B may be configured for image stabilization during shooting. For example, when the shutter is pressed, the gyro sensor 180B detects an angle at which the mobile phone shakes, calculates, based on the angle, a distance for which a lens module needs to compensate, and causes a lens to be in reverse motion to counteract the shake of the mobile phone, to implement image stabilization. The gyro sensor 180B may be further used in navigation and somatosensory game scenarios.

The barometric pressure sensor 180C is configured to measure barometric pressure. In some embodiments, the mobile phone calculates an altitude by using a barometric pressure value measured by the barometric pressure sensor 180C, to assist in positioning and navigation.

The magnetic sensor 180D includes a Hall effect sensor. The mobile phone may detect opening and closing of a clamshell or a smart cover by using the magnetic sensor 180D. In some embodiments, when the mobile phone is a clamshell device, the mobile phone may detect opening and closing of a clamshell by using the magnetic sensor 180D. Then, a feature such as automatic unlocking of a clamshell is set based on a detected opening/closing state of a smart cover or a detected opening/closing state of the clamshell.

The acceleration sensor 180E may detect magnitudes of accelerations of the mobile phone in various directions (usually three axes). When the mobile phone is static, a magnitude and a direction of gravity may be detected. The acceleration sensor 180E may be further configured to recognize a posture of an electronic device, for use in applications such as landscape/portrait orientation switching and pedometer.

The distance sensor 180F is configured to measure a distance. The mobile phone may measure a distance by using infrared or a laser. In some embodiments, in a shooting scenario, the mobile phone may measure a distance by using the distance sensor 180F, to implement fast focusing.

The proximity light sensor 180G may include, for example, a light emitting diode (LED) and an optical detector, for example, a photodiode. The light emitting diode may be an infrared light emitting diode. The mobile phone emits infrared light to the outside by using the light emitting diode, and the mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone. The mobile phone may detect, by using the proximity light sensor 180G, that the user holds the mobile phone close to an ear to make a call, and then automatically turn off a screen to save power. The proximity light sensor 180G may also be used in a smart cover mode and a pocket mode to automatically unlock and lock the screen.

The ambient light sensor 180L is configured to sense brightness of ambient light. The mobile phone may adaptively adjust brightness of the display 194 based on the sensed brightness of the ambient light. The ambient light sensor 180L may also be configured to automatically adjust white balance during photographing. The ambient light sensor 180L may further cooperate with the proximity light sensor 180G to detect whether the mobile phone is in a pocket, to prevent an accidental touch.

The fingerprint sensor 180H is configured to collect a fingerprint. The mobile phone may implement fingerprint unlocking, application lock access, fingerprint-based photographing, fingerprint-based call answering, and the like by using characteristics of a collected fingerprint.

The temperature sensor 180J is configured to detect a temperature. In some embodiments, the mobile phone executes a temperature processing policy based on a temperature detected by the temperature sensor 180J. For example, when a temperature reported by the temperature sensor 180J exceeds a threshold, the mobile phone degrades performance of a processor near the temperature sensor 180J, to reduce power consumption and implement thermal protection. In some other embodiments, when a temperature is lower than another threshold, the mobile phone heats the battery 142, to avoid abnormal power-off of the mobile phone due to a low temperature. In some other embodiments, when a temperature is lower than still another threshold, the mobile phone boosts an output voltage of the battery 142, to avoid abnormal power-off due to a low temperature.

The touch sensor 180K is also referred to as a "touch device". The touch sensor 180K may be provided in the display 194. The touch sensor 180K and the display 194 form a touchscreen, also referred to as a "touchscreen". The touch sensor 180K is configured to detect a touch operation performed on or near the touchscreen. The touch sensor may transfer the detected touch operation to the application processor for determining a type of a touch event. The display 194 may provide a visual output related to the touch operation. In some other embodiments, the touch sensor 180K may be alternatively provided on a surface of the mobile phone, and a location of the touch sensor 180K is different from a location of the display 194.

The bone conduction sensor 180M may obtain a vibration signal. In some embodiments, the bone conduction sensor 180M may obtain a vibration signal from a vibration bone in a vocal part of a human body. The bone conduction sensor 180M may also be in contact with a human pulse to receive a blood pressure beating signal. In some embodiments, the bone conduction sensor 180M may also be provided in an earphone, together forming a bone conduction earphone. The audio module 170 may obtain a voice signal through parsing based on a vibration signal that is obtained by the bone conduction sensor 180M from a vibration bone in a vocal part, to implement a speech function. The application processor may parse heart rate information based on a blood pressure beating signal obtained by the bone conduction sensor 180M, to implement a heart rate detection function.

The key 190 includes a power key, a volume key, and the like. The key 190 may be a mechanical key or may be a touch key. The mobile phone may receive a key-based input, and generate a key signal input related to a user setting and function control of the mobile phone.

The motor 191 may generate a vibration prompt. The motor 191 may be configured to provide a vibration alert for an incoming call, or may be configured to provide a touch vibration feedback. For example, touch operations performed on different applications (for example, photographing and audio playing) may be corresponding to different vibration feedback effects. For touch operations performed on different regions of the display 194, the motor 191 may also correspondingly provide different vibration feedback effects. Different application scenarios (for example, time reminder, message reception, alarm clock, and gaming) may also be corresponding to different vibration feedback effects. In addition, touch vibration feedback effects can be customized.

The indicator 192 may be an indicator, may be configured to indicate a charging status and a battery level change, and may also be configured to indicate a message, a missed call, a notification, and the like.

The SIM card interface 195 is configured to connect a SIM card. The SIM card may be inserted into the SIM card interface 195 or removed from the SIM card interface 195 to touch or separate from the mobile phone. The mobile phone may support one or N SIM card interfaces, where N is a positive integer greater than 1. The SIM card interface 195 may support a nano-SIM card, a micro-SIM card, a SIM card, and the like. A plurality of SIM cards may be inserted into a same SIM card interface 195 at the same time. The plurality of SIM cards may be of a same type, or may be of different types. The SIM card interface 195 may also be compatible with different types of SIM cards. The SIM card interface 195 may further be compatible with an external memory card. The mobile phone interacts with a network by using a SIM card, to implement functions such as calling and data communication. In some embodiments, the mobile phone uses an eSIM card, that is, an embedded SIM card. The eSIM card may be embedded into the mobile phone, and cannot be separated from the mobile phone.

A software system of the mobile phone may use a layered architecture, an event-driven architecture, a microkernel architecture, a microservice architecture, or a cloud architecture. In this embodiment of this application, a software structure of a mobile phone is described by using an Android system with a layered architecture as an example.

Figure 6:
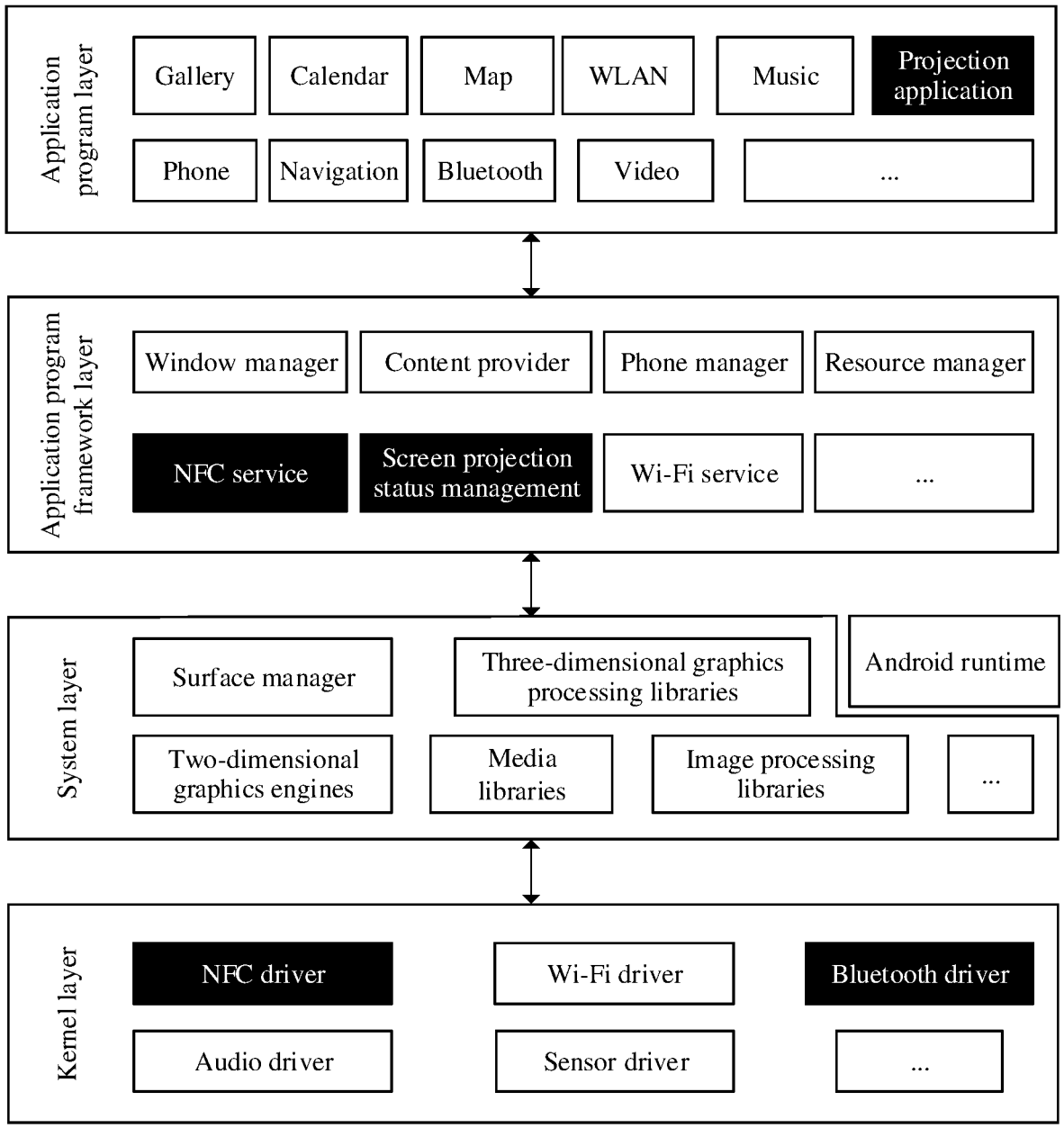
FIG. 6 is a schematic architectural diagram of an operating system in an electronic device according to an embodiment of this application.

An example in which the foregoing electronic device is a mobile phone is still used. FIG. 6 shows a block diagram of a software structure of a mobile phone according to an embodiment of this application.

In a layered architecture, software is divided into several layers, and each layer has clear roles and responsibilities. The layers communicate with each other through software interfaces. In some embodiments, an Android system is divided into four layers. From top to bottom, they are: an application program layer, an application program framework layer, Android runtime (Android runtime) and system libraries, and a kernel layer.

The application program layer may include a series of application programs.

As shown in FIG. 6, apps (application, application) such as Phone, Notepad, Browser, Contacts, Camera, Gallery, Calendar, Map, Bluetooth, Music, Video, and Messaging may be installed at the application program layer.

In this embodiment of this application, still as shown in FIG. 6, a projection application may also be installed at the application program layer. A user may launch the projection application through an entry such as a home screen, a setting function, or a drop-down menu.

The projection application may serve as a bridge between the mobile phone (that is, a source device) and another electronic device (that is, a target device) during content projection, so that projection content that is in an application in the mobile phone and that needs to be projected is sent to the target device. For example, the projection application may receive a screen projection event reported by the application program layer. Then, the projection application may interact with a running application (for example, a video app), use content being displayed or played in the application as projection content, and send the projection content to the target device in a wireless communication manner, for example, Wi-Fi.

In addition, the user may further set a binding relationship between an NFC tag and one or more electronic devices by using the projection application. For example, an option for binding an NFC tag may be set in the projection application. After the mobile phone detects that the user has enabled the option, the projection application may display a list of to-be-bound electronic devices. After selecting one or more electronic devices that need to be bound from the list, the user may place the mobile phone close to an NFC tag that needs to be bound. In this way, the mobile phone may write an identifier of an electronic device selected by the user in the projection application to the NFC tag by using an NFC signal, thereby establishing a binding relationship between the NFC tag and the one or more electronic devices in the NFC tag.

The application program framework layer provides application programming interfaces (application programming interface, API) and a programming framework for an application program at the application program layer. The application program framework layer includes some predefined functions.

In this embodiment of this application, as shown in FIG. 6, an NFC service (NFC service) and screen projection status management may run at the application program framework layer.

For example, after enabling an NFC function, the mobile phone may start to run the NFC service at the application program framework layer. When the mobile phone approaches or touches an NFC tag, the NFC service may invoke an NFC driver at the kernel layer to read a binding relationship stored in the NFC tag, thereby obtaining a target device for this content projection. Then, the NFC service may report a projection event to the projection application, thereby triggering the projection application to send content being displayed or played by the mobile phone as projection content to the target device and starting this content projection process.

A screen projection status management module is associated with the NFC service and a Bluetooth function. For example, a mobile phone A has projected content in the mobile phone A to a target device by approaching or touching an NFC tag. When a mobile phone B approaches or touches the mobile phone A, an NFC service in the mobile phone B provides a near field discovery function and sends a Bluetooth MAC address of the mobile phone B to the mobile phone A. In response to the received Bluetooth MAC address, the mobile phone A sends a directional Bluetooth connection request. After the mobile phone B accepts the Bluetooth connection request from the mobile phone A, a Bluetooth connection is established between the mobile phone A and the mobile phone B. A screen projection status management module of the mobile phone A pushes cached connection status information to the mobile phone B by using Bluetooth. The mobile phone B learns a target device for content projection based on the cached connection status information. Then, the NFC service in the mobile phone B may report a projection event to a projection application, thereby triggering the projection application to send content being displayed or played by the mobile phone B as projection content to the target device and starting a content projection process.

Certainly, as shown in FIG. 6, the application program framework layer may further include a Wi-Fi service (Wi-Fi service), a window manager, a content provider, a view system, a phone manager, a resource manager, and the like. This is not limited in this embodiment of this application.

The Wi-Fi service may be configured to provide a Wi-Fi-related function, such as joining a Wi-Fi network or establishing a Wi-Fi P2P connection to another electronic device. The window manager is configured to manage a window program. The window manager may obtain a size of a display, determine whether there is a status bar, lock a screen, capture the screen, and the like. The content provider is configured to store and obtain data and to make the data accessible to an application program. The data may include videos, images, audio, calls made and answered, a browsing history and bookmarks, a phone book, and the like. The view system includes a visualization control, for example, a control for displaying text or a control for displaying a picture. The view system may be configured to build an application program. A display interface may include one or more views. For example, a display interface including a message notification icon may include a view for displaying text and a view for displaying a picture. The phone manager is configured to provide a communication function of the mobile phone, for example, management of call status (including connection setup and teardown). The resource manager provides various resources for an application program, such as a localized character string, an icon, a picture, a layout file, and a video file.

As shown in FIG. 6, the system libraries may include a plurality of functional modules, for example, a surface manager (surface manager), media libraries (Media Libraries), three-dimensional graphics processing libraries (for example, OpenGL ES), and 2D graphics engines (for example, SGL).

The surface manager is configured to manage a display subsystem, and combine 2D and 3D graphic layers for a plurality of application programs. The media library supports playback and recording of audio and videos in a plurality of commonly used formats, as well as static image files. The media library may support a plurality of audio and video encoding formats, such as MPEG4, H.264, MP3, AAC, AMR, JPG, and PNG. The three-dimensional graphics processing library is configured to implement three-dimensional graphics drawing, image rendering and compositing, graphic layer processing, and the like. The 2D graphics engine is a drawing engine for 2D drawing.

The Android runtime includes core libraries and a virtual machine. The Android runtime is responsible for scheduling and managing an Android system.

The core libraries include two parts: One is functions that need to be called by a Java language, and the other is Android core libraries.

The application program layer and the application program framework layer run on the virtual machine. The virtual machine executes Java files at the application program layer and the application program framework layer as binary files. The virtual machine is configured to perform functions such as object lifecycle management, stack management, thread management, security and exception management, and garbage collection.

The kernel layer is a layer between hardware and software. The kernel layer includes at least a display driver, a camera driver, an audio driver, a sensor driver, and the like. This is not limited in this embodiment of this application.

The following describes in detail a cross-device content projection method provided in the embodiments of this application with reference to the accompanying drawings.

Figure 7:
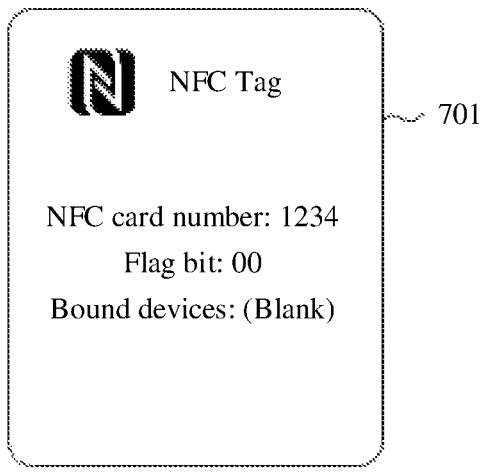
FIG. 7 is schematic diagram 1 of an application scenario of a cross-device content projection method according to an embodiment of this application.

For example, as shown in FIG. 7, each NFC tag 701 may store its own NFC card number in the NFC tag 701 before leaving factory. In addition, as shown in FIG. 7, a flag bit may be preset in each NFC tag 701, and the flag bit is used to indicate whether the NFC tag 701 has established a binding relationship with an electronic device. For example, when the flag bit in the NFC tag 701 is 00, it indicates that the NFC tag 701 has not been bound to an electronic device; or when the flag bit in the NFC tag 701 is 01, it indicates that the NFC tag 701 has been bound to one or more electronic devices.

When a user uses the NFC tag 701 for the first time, the user may use a preset projection application to establish, in the NFC tag 701, a binding relationship between the NFC tag 701 and one or more electronic devices.

Figure 8:
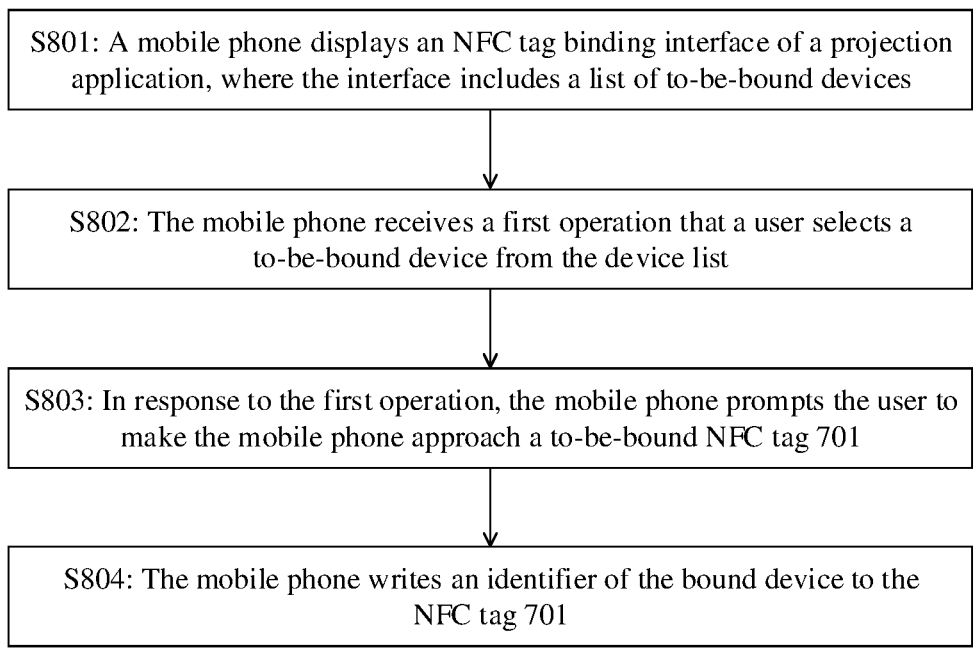
FIG. 8 is schematic flowchart 1 of a cross-device content projection method according to an embodiment of this application.

A mobile phone in which the projection application is installed is used as an example. As shown in FIG. 8, a method for establishing the binding relationship in the NFC tag 701 by using the projection application may include the following steps.

S801: The mobile phone displays an NFC tag binding interface of the projection application, where the interface includes a list of to-be-bound devices.

For example, when a user uses the NFC tag 701 for the first time, the user may enable an NFC function of the mobile phone and make the mobile phone approach or touch the NFC tag 701. In this case, the mobile phone may interact with the NFC tag 701 by using an NFC signal, so that the mobile phone reads an NFC card number and a preset flag bit that are in the NFC tag 701. If the flag bit is 00, it indicates that the NFC tag 701 has not been bound to an electronic device. Then, as shown in FIG. 9, the mobile phone may prompt the user to establish a binding relationship between the NFC tag 701 and one or more electronic devices.

Figure 9:
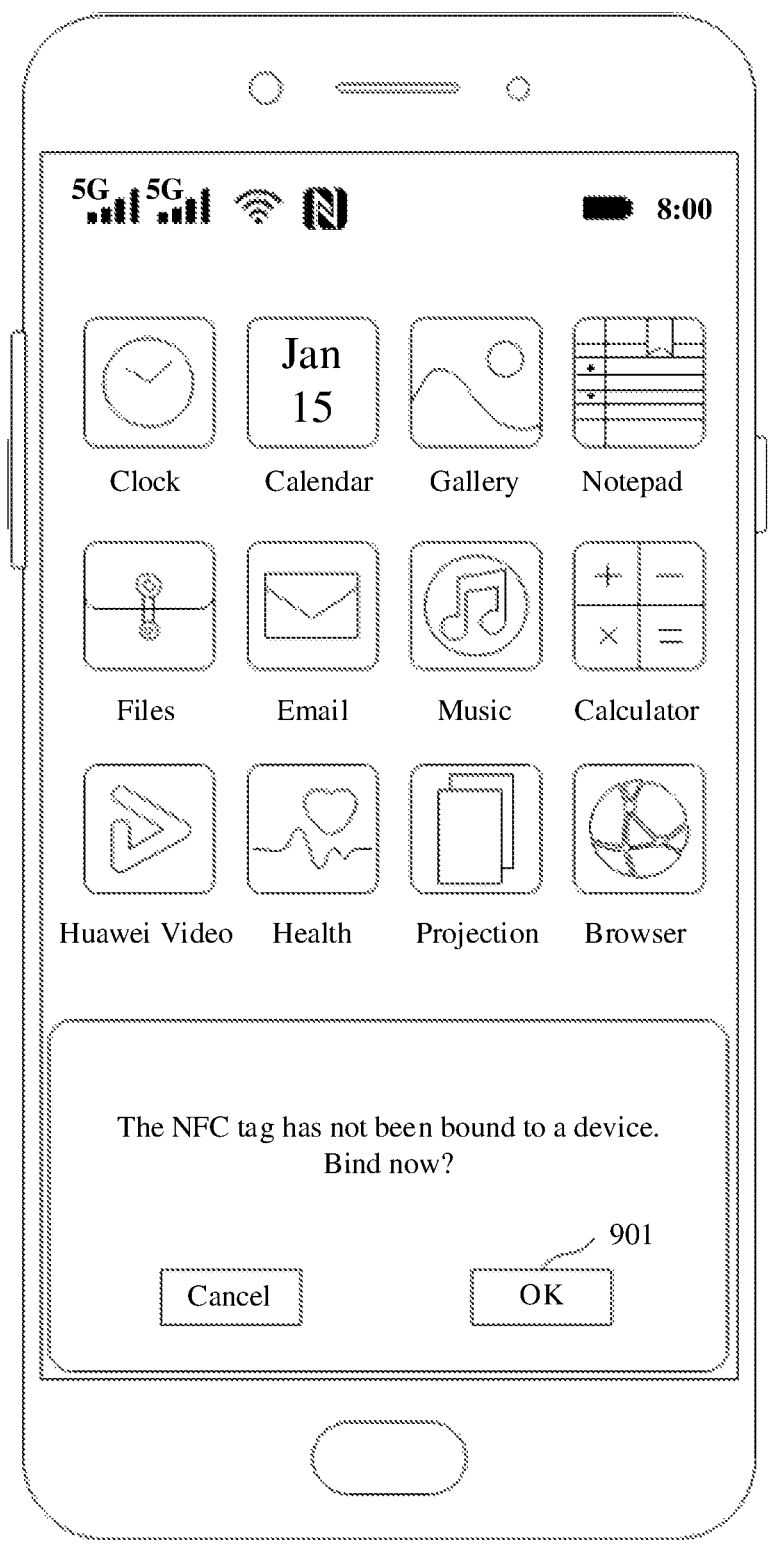
FIG. 9 is schematic diagram 2 of an application scenario of a cross-device content projection method according to an embodiment of this application.
Figure 10:
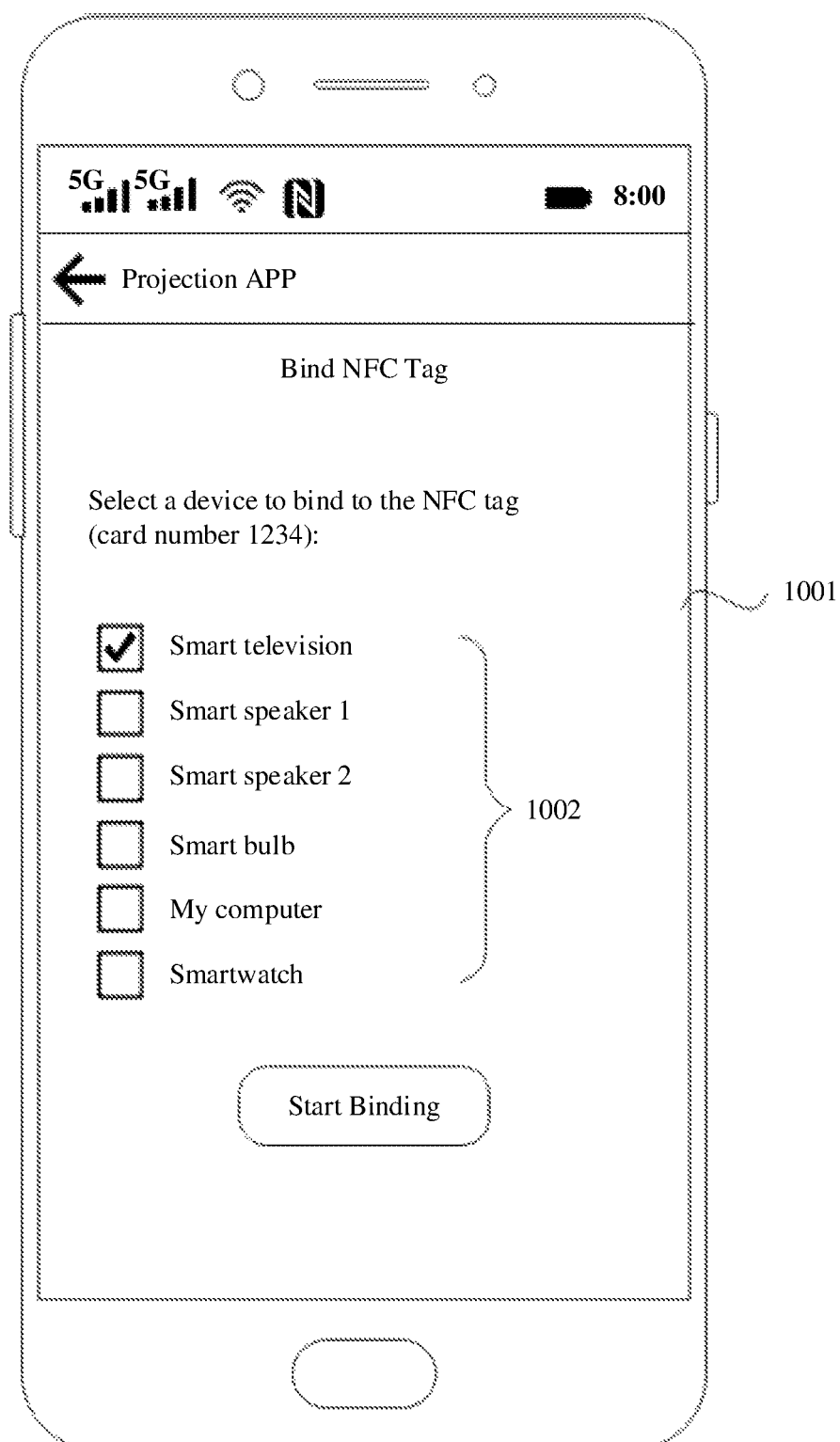
FIG. 10 is schematic diagram 3 of an application scenario of a cross-device content projection method according to an embodiment of this application.

If it is detected that the user taps the OK button 901 shown in FIG. 9, the mobile phone may launch the projection application and automatically jump to a binding interface 1001 of the NFC tag 701, as shown in FIG. 10. On the binding interface 1001, the mobile phone may display a device list 1002 including one or more electronic devices. Each electronic device in the device list 1002 is a device that can be bound to the NFC tag 701. For example, the electronic devices in the device list 1002 may be one or more devices that use a same login account (for example, a Huawei account) as the mobile phone. For another example, the electronic devices in the device list 1002 may be one or more devices that are connected to a same Wi-Fi network as the mobile phone. The user selects, from the device list 1002, an electronic device that needs to be bound to the NFC tag 701.

In this embodiment of this application, the NFC tag 701 may be bound to one or more electronic devices. In other words, the user may select one or more electronic devices from the device list 1002 as bound devices of the NFC tag 701.

Figure 11:
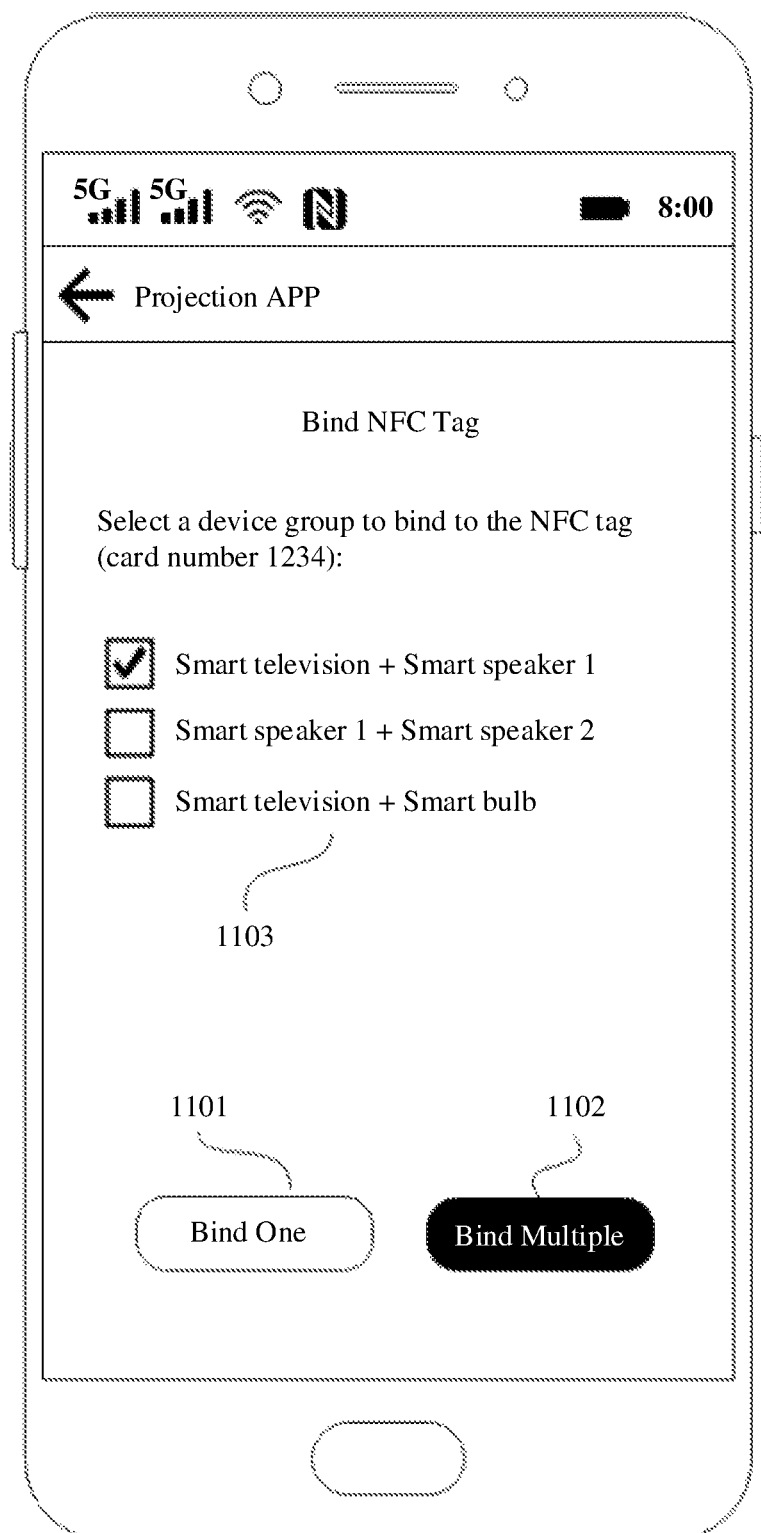
FIG. 11 is schematic diagram 4 of an application scenario of a cross-device content projection method according to an embodiment of this application.

Alternatively, as shown in FIG. 11, a binding option 1101 for a single electronic device and a binding option 1102 for a plurality of electronic devices may be preset in the projection application. If the user selects the binding option 1101, the mobile phone may prompt the user to select one electronic device to be bound to the NFC tag 701 from a device list on a corresponding binding interface. If the user selects the binding option 1102, still as shown in FIG. ii, the mobile phone may display one or more preset device groups 1103 on a corresponding binding interface, where each device group includes a plurality of electronic devices. For example, a smart television and a smart speaker 1 form a device group, the smart speaker 1 and a smart speaker 2 form a device group, and the smart television and a smart bulb form a device group. In this case, when the user selects a device group on the binding interface, the mobile phone may be triggered to bind the NFC tag 701 to a plurality of electronic devices in the device group.

S802: The mobile phone receives a first operation that the user selects a to-be-bound device from the device list.

In step S802, after the mobile phone displays the binding interface of the projection application, the user may select one or more electronic devices to be bound to the NFC tag 701 from the device list or the device groups listed on the binding interface. The one or more electronic devices selected by the user may be referred to as a bound device or bound devices of the NFC tag 701. After detecting that the user selects a bound device on the binding interface, the mobile phone may continue to perform steps S803 and S804.

S803: In response to the first operation, the mobile phone prompts the user to make the mobile phone approach the to-be-bound NFC tag 701.

Figure 12:
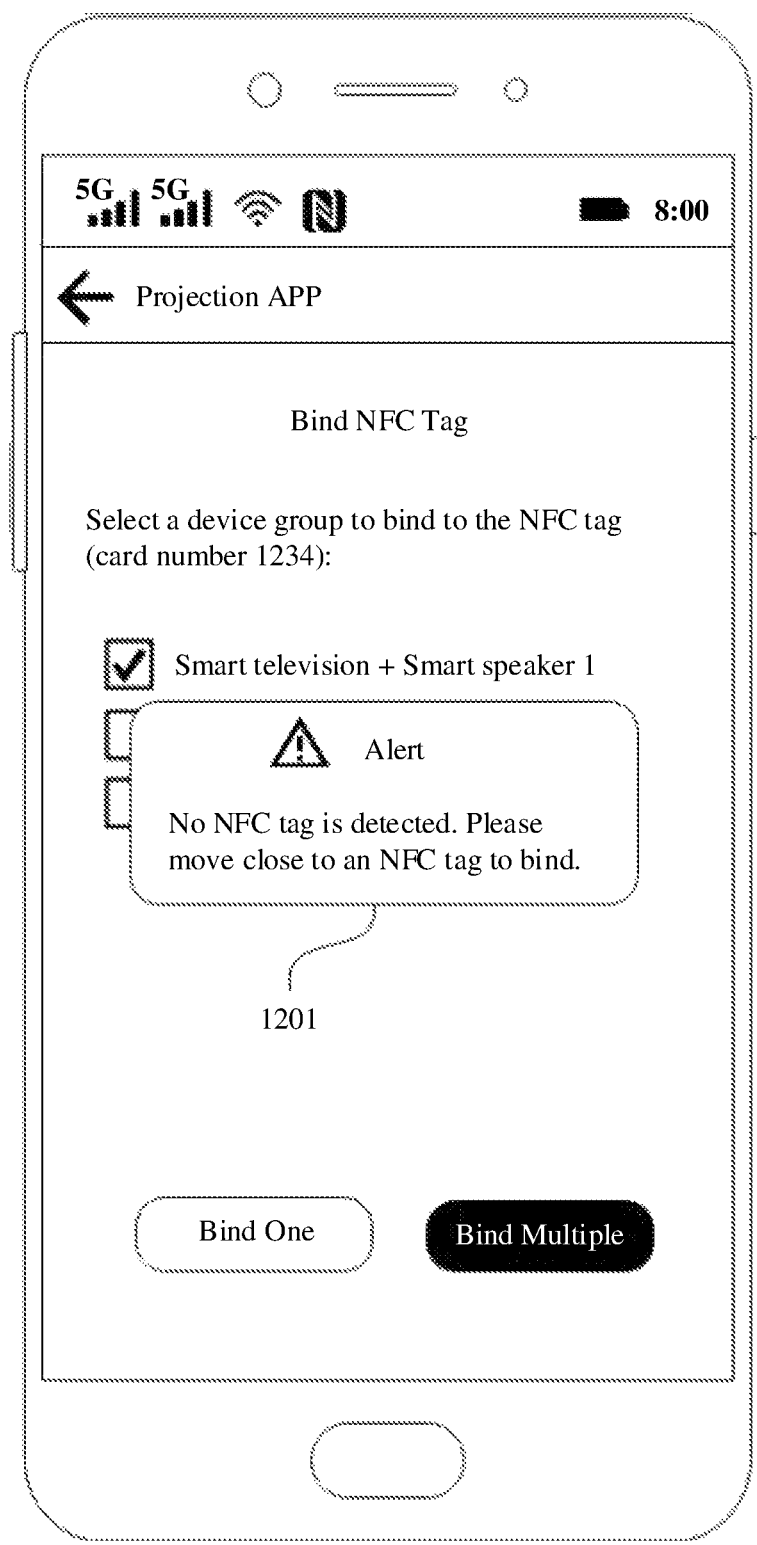
FIG. 12 is schematic diagram 5 of an application scenario of a cross-device content projection method according to an embodiment of this application.

An example is used in which the bound devices are the smart television and the smart speaker 1. After the mobile phone detects that the user selects the smart television and the smart speaker 1 on the binding interface, a binding relationship between the NFC tag 701 and the smart television and the smart speaker 1 may be determined. In this case, the mobile phone needs to write the binding relationship to the NFC tag 701. The mobile phone needs to communicate with the NFC tag 701 by using a short-distance NFC signal. Therefore, as shown in FIG. 12, if the mobile phone does not detect an NFC signal sent by the NFC tag 701, the mobile phone may display a prompt 1201 in the projection application. The prompt 1201 is used to instruct the user to make the mobile phone approach or touch the NFC tag 701 that waits for binding to the smart television and the smart speaker 1.

S804: The mobile phone writes an identifier of the bound device to the NFC tag 701 to establish a binding relationship between the NFC tag 701 and the bound device.

Figure 13:
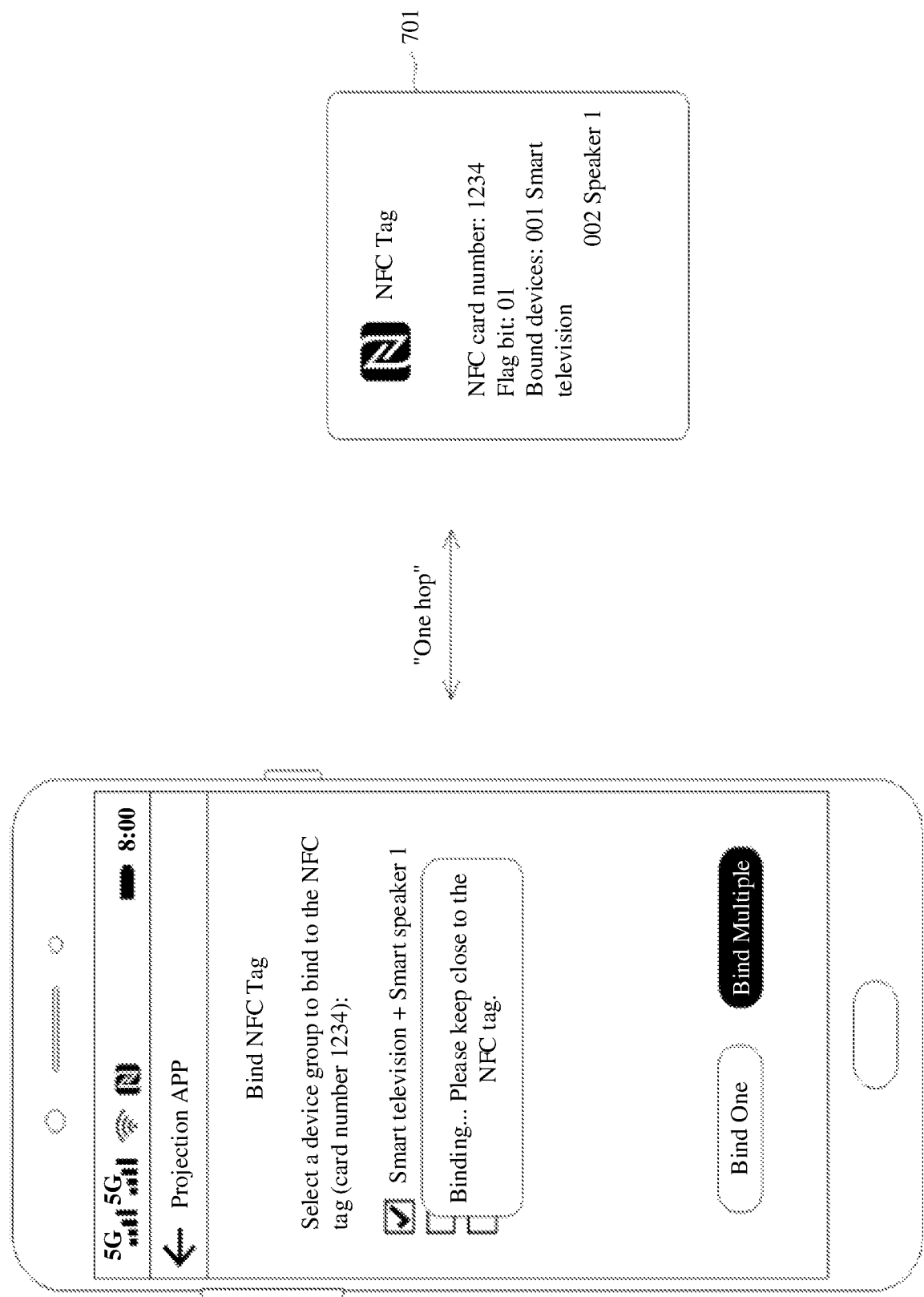
FIG. 13 is schematic diagram 6 of an application scenario of a cross-device content projection method according to an embodiment of this application.

For example, the user may make the mobile phone approach or touch the NFC tag 701 based on the prompt shown in FIG. 12. When a distance between the mobile phone and the NFC tag 701 is short enough, the mobile phone may detect an NFC signal sent by the NFC tag 701. Then, as shown in FIG. 13, the mobile phone may write the identifier that is of the bound device and that is set by the user on the binding interface to the NFC tag 701. For example, the mobile phone may write a MAC address, a device name, an IP address, or the like of the bound device to the NFC tag 701. In this way, the binding relationship between the NFC tag 701 and the bound device is established in the NFC tag 701. Later, by reading an identifier of a bound device in the NFC tag 701, a source device for content projection, for example, a mobile phone, may determine one or more electronic devices that are bound to the NFC tag 701 which are target devices for content projection.

In addition, after the mobile phone writes the identifier of the bound device to the NFC tag 704 the NFC tag 701 may change the preset flag bit from 00 to 01, to indicate that the NFC tag 701 currently has been bound to one or more electronic devices.

In some embodiments, after the mobile phone writes the identifier of the bound device to the NFC tag 701, the user may continue to set, in the projection application, a projection policy used when the device bound to the NFC tag 701 performs content projection.

Figure 14:
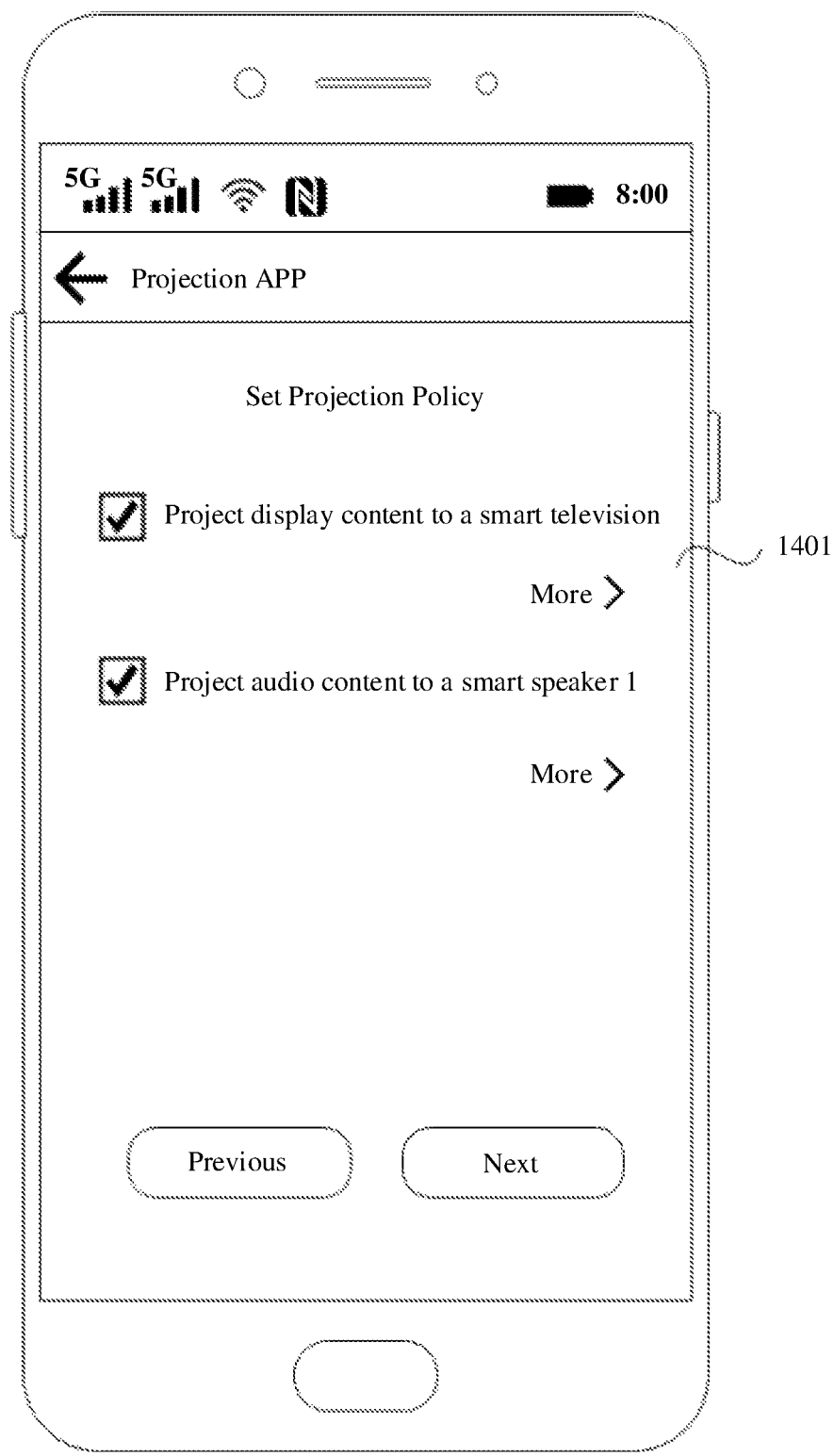
FIG. 14 is schematic diagram 7 of an application scenario of a cross-device content projection method according to an embodiment of this application.

An example is used in which the bound devices of the NFC tag 701 are the smart television and the smart speaker 1. After the mobile phone writes identifiers of the smart television and the smart speaker 1 to the NFC tag 701, the mobile phone may also prompt, in the projection application, the user to set a projection policy for projecting content to the two bound devices. For example, as shown in FIG. 14, the user may set, on a setting interface 1401, that display content in the source device is projected to the smart television for displaying, and audio content in the source device is projected to the smart speaker 1 for playing when content projection is performed to the smart television and the smart speaker 1. Certainly, the user may further set a specific projection policy used when the display content is projected to the smart television, a specific projection policy used when the audio content is projected to the speaker, and the like. This is not limited in this embodiment of this application.

Likewise, after receiving the projection policies set by the user on the setting interface 1401, the mobile phone may establish an association relationship between the NFC tag 701, the bound devices (that is, the smart television and the smart speaker 1), and the projection policies. Later, the mobile phone may be triggered, by approaching or touching the NFC tag 701, to perform content projection to the two bound devices according to the projection policies set by the user, thereby simplifying an operation process of cross-device content projection.

It should be noted that the projection policies used when content projection is performed to the bound devices of the NFC tag 701 may be manually set by the user by using the projection application, or may be preset by the mobile phone based on information about the bound devices, such as types, locations, and device capabilities of the bound devices. For example, when the bound devices of the NFC tag 701 are the smart speaker 1 and the smart speaker 2, the mobile phone may determine a projection policy by default that a smart speaker closest to the user is used for content projection.

In some other embodiments, the projection policies may alternatively be dynamically set by the source device in a process of content projection to the bound devices of the NFC tag 701. For example, when performing content projection to the bound devices (such as the smart television and the smart speaker) of the NFC tag 701, the mobile phone may dynamically obtain audio playing capabilities of the smart television and the smart speaker. Then, the mobile phone may determine to project audio content to the smart television and/or the smart speaker based on the audio playing capabilities of the smart television and the smart speaker. The embodiments of this application do not impose any limitation on specific content of a projection policy and a specific manner of setting a projection policy.

For example, the user may set one or more corresponding bound devices for different NFC tags according to the foregoing method. When the user needs to perform content projection to one bound device or a group of bound devices, the user may enable an NFC function of a source device, and make the source device approach or touch a corresponding NFC tag, thereby using one or more bound devices of the NFC tag as a target device or target devices for this content projection and starting a content projection process.

Figure 15:
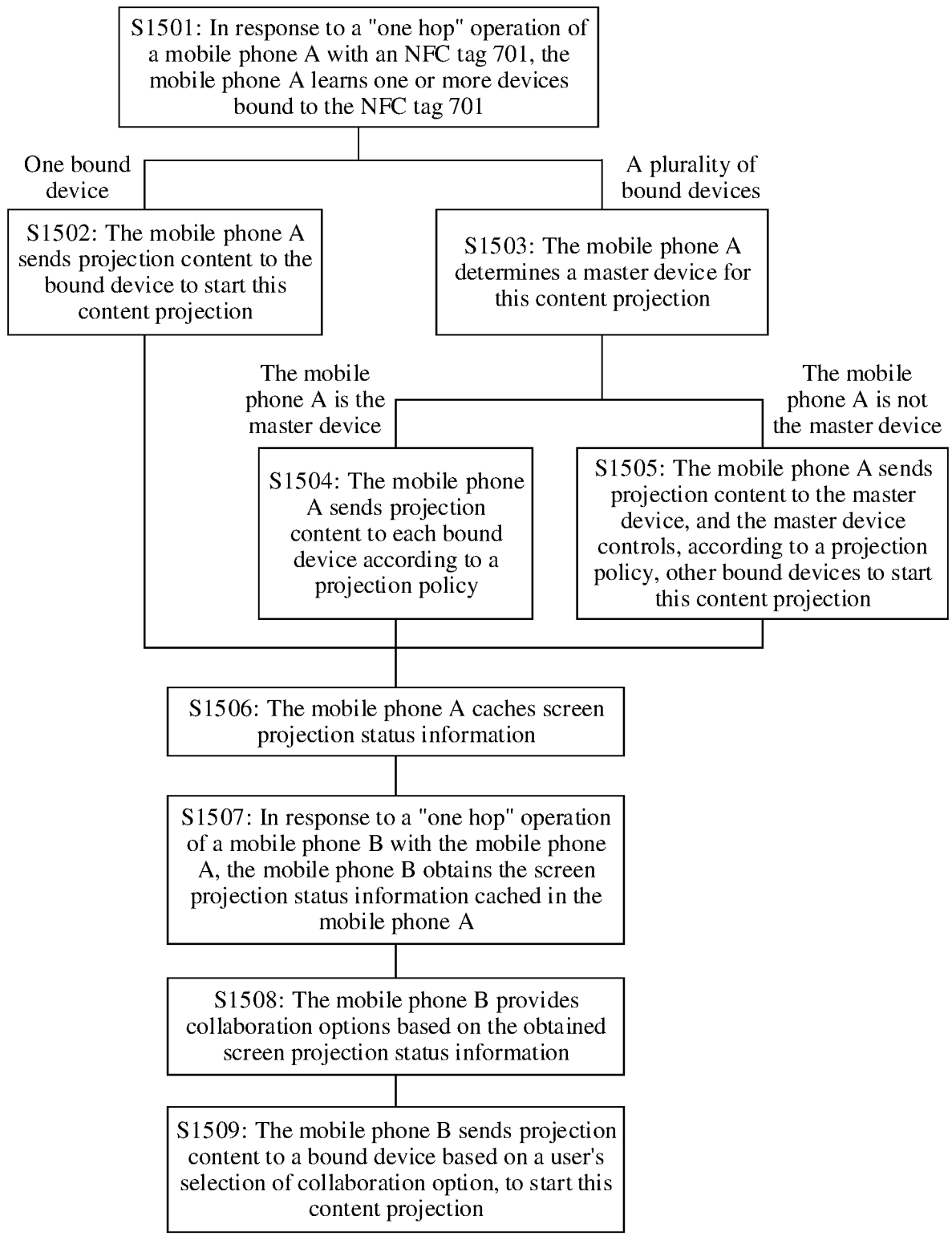
FIG. 15 is schematic diagram 8 of an application scenario of a cross-device content projection method according to an embodiment of this application.

An example in which a source device is a mobile phone is used in the following to describe a method used by the mobile phone to perform content projection to a target device by touching an NFC tag 701. As shown in FIG. 15, the method may include the following steps.

S1501: In response to a "one hop" operation of a mobile phone A with an NFC tag 701, the mobile phone A learns one or more devices bound to the NFC tag 701.

Figure 16:
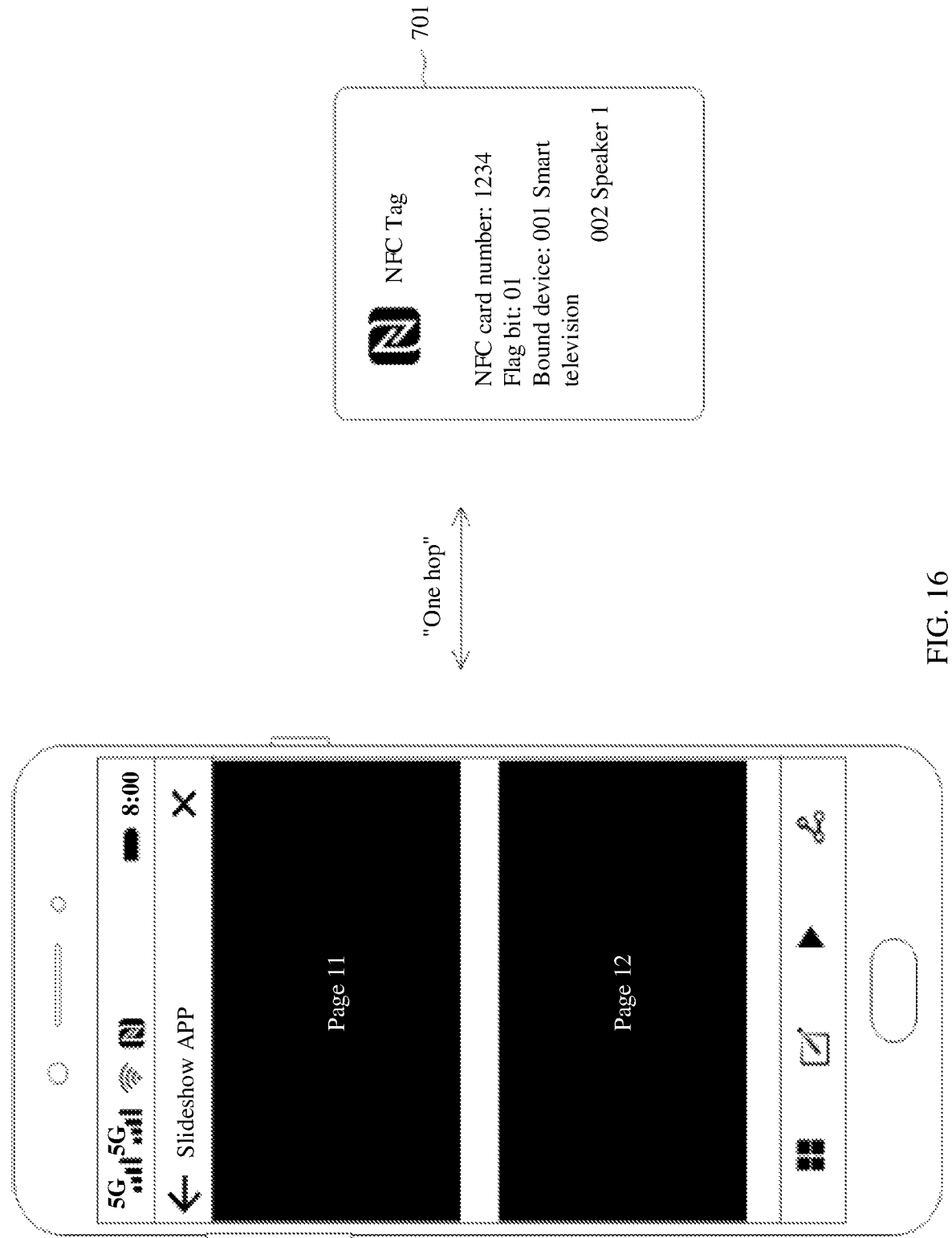
FIG. 16 is schematic diagram 9 of an application scenario of a cross-device content projection method according to an embodiment of this application.

For example, by performing steps S801 to S804, the mobile phone has set a corresponding bound device for the NFC tag 701. In this case, when a user expects to project content (such as display content and audio content) in the mobile phone (that is, a source device) to the bound device of the NFC tag 701, as shown in FIG. 16, the user may enable an NFC function of the mobile phone A, and make the mobile phone A touch (or approach) the NFC tag 701, meaning performing a "one hop" operation of the mobile phone A with the NFC tag 701.

In response to the "one hop" operation of the mobile phone A with the NFC tag 701, the mobile phone A may read, from the NFC tag 701, an identifier or identifiers of the one or more bound devices of the NFC tag 701. The bound device may serve as a target device of the mobile phone for this content projection. In other words, the "one hop" operation performed by the user to make the source device touch the NFC tag may trigger the source device to learn the target device for this content projection, and thereby to automatically complete a subsequent content projection process with the target device. In this way, an operation procedure during content projection is simplified, and working efficiency of collaboration between a plurality of devices is improved.

Certainly, if no identifier of a bound device is stored in the NFC tag 701, the mobile phone may establish a correspondence between the NFC tag 701 and the corresponding bound device by performing steps S801 to S804.

S1502: When one electronic device is bound to the NFC tag 701, the mobile phone A sends projection content to the bound device to start this content projection.

Figure 17:
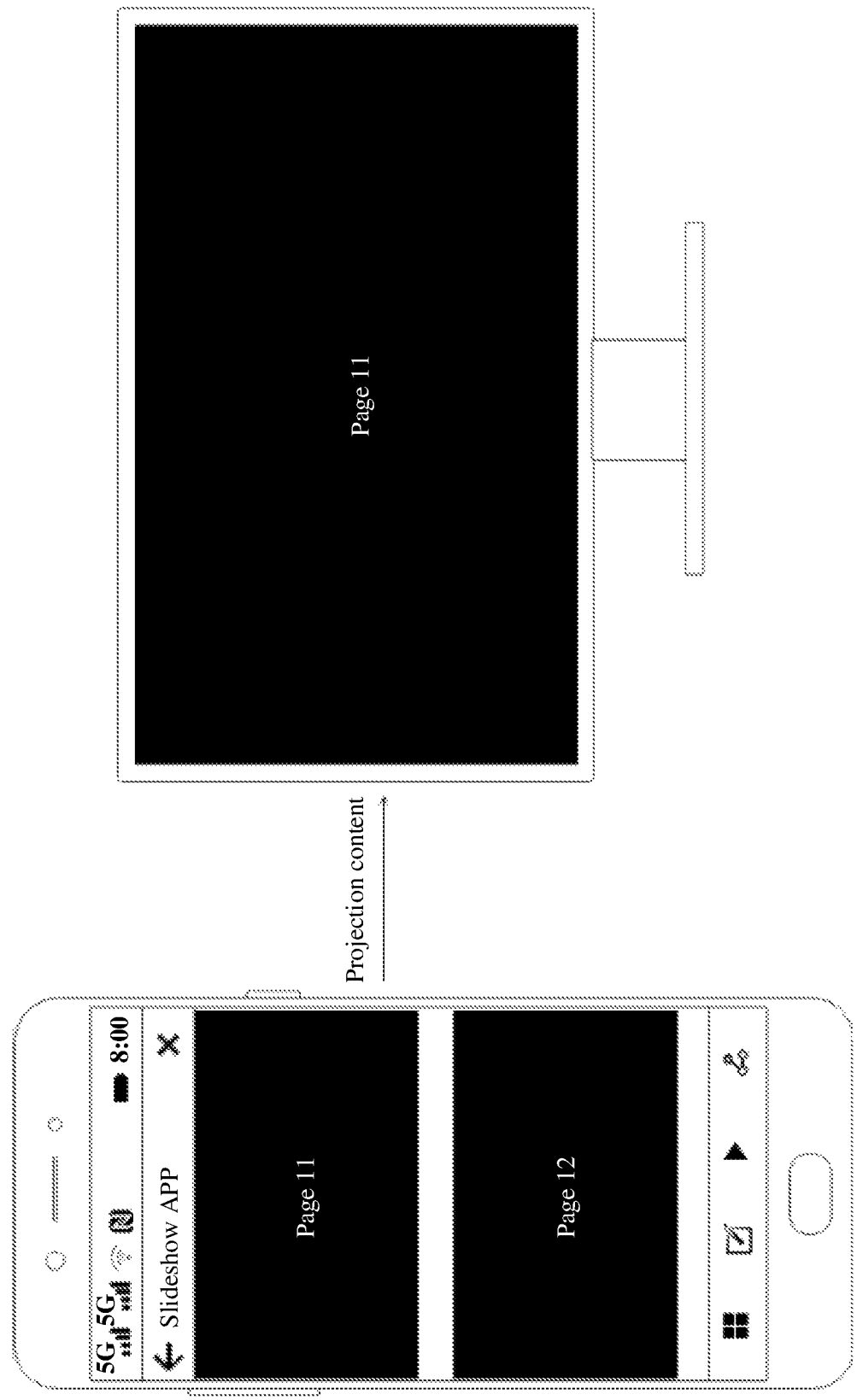
FIG. 17 is schematic diagram 10 of an application scenario of a cross-device content projection method according to an embodiment of this application.

When the mobile phone A reads an identifier of only one bound device in the NFC tag 701, it indicates that there is only one bound device of the NFC tag 701. In this case, the target device for this content projection is the bound device. An example is used in which the bound device is a smart television. After the mobile phone A reads an identifier of the smart television in the NFC tag 701, as shown in FIG. 17, the mobile phone A may consider the smart television as the target device for this content projection and send this projection content to the smart television to start the content projection. The projection content may include content being played by the mobile phone, for example, display content and/or audio content being played by the mobile phone. The display content may include a picture, an image in a video, part or all of content on a current display interface, or the like.

For example, the mobile phone may query, based on the identifier of the smart television, whether a currently connected Wi-Fi network includes the smart television. If the smart television is included, it indicates that the smart television is connected to the Wi-Fi network. In this case, the mobile phone may dynamically send this projection content to the smart television through the Wi-Fi network. If the smart television is not included, it indicates that the smart television has not been connected to the Wi-Fi network in which the mobile phone is located. In this case, the mobile phone may prompt the user to connect the smart television to the same Wi-Fi network in which the mobile phone is located. Then, the mobile phone may dynamically send this projection content to the smart television through the Wi-Fi network.

Alternatively, if the Wi-Fi network in which the mobile phone is located does not include the smart television, the mobile phone may automatically establish a wireless communication connection to the smart television based on the read identifier of the smart television (for example, a MAC address of the smart television). For example, the mobile phone may establish a Bluetooth connection, a Wi-Fi P2P connection, or the like to the smart television. This is not limited in this embodiment of this application.

In addition, the projection content sent by the mobile phone to the smart television may include display content of the mobile phone. For example, the mobile phone may send each image frame displayed in real time to the smart television in a mirrored screen projection manner, and the smart television synchronously displays a display interface of the mobile phone. For another example, the mobile phone may send, in a DLNA (digital living network alliance, digital living network alliance) screen projection manner, part of display content, such as a video or a picture on a display interface of the mobile phone to the smart television for displaying.

For example, it is assumed that the mobile phone A is displaying a playing interface of a slideshow A when the mobile phone A touches or approaches the NFC tag 701. When the bound device of the NFC tag 701 is the smart television, the mobile phone A may serve as the source device to send the entire playing interface (that is, all display content on a display interface) as projection content to the smart television. Alternatively, the mobile phone may serve as the source device to send a video image in the slideshow A on the playing interface (that is, part of display content on a display interface) as projection content to the smart television.

Certainly, the projection content sent by the mobile phone to the smart television may also include audio content being played by the mobile phone. For example, the audio content may be an audio file corresponding to a slideshow image being displayed by the mobile phone. After receiving the projection content sent by the mobile phone in real time, the smart television may display or play the projection content, to complete this content projection.

The example in which the target device for this content projection is the smart television is still used. In some embodiments, when the mobile phone performs content projection to the smart television, the user may trigger, through interaction between the mobile phone and the NFC tag 701, the mobile phone to send a corresponding projection instruction to the smart television, thereby implementing a corresponding control function in the content projection process.

S1503: When a plurality of electronic devices are bound to the NFC tag 701, the mobile phone A determines a master device for this content projection.

The master (master) device for this content projection may be the source device (that is, the mobile phone), or may be one of the plurality of bound devices of the NFC tag 701. The master device may serve as a control node to connect to and interact with other devices (that is, slave devices) by using a star topology structure.

In some embodiments, when there is a plurality of bound devices of the NFC tag 701, the mobile phone may determine a specific master device based on information such as device types or device capabilities of the plurality of bound devices. For example, the mobile phone may query computing capabilities of the plurality of bound devices and determine a bound device with a strongest computing capability as the master device for this content projection. In this case, the mobile phone and the other bound devices may serve as slave devices of the master device.

In some other embodiments, the mobile phone may preset specific master devices corresponding to different content projection scenarios. For example, when the bound devices are a smart television and a smart bulb, the master device may be set to the smart television, and the slave devices may be set to the mobile phone and the smart bulb. For another example, when the bound devices are a smart speaker 1 and a smart speaker 2, the master device may be set to the mobile phone, and the slave devices may be set to the smart speaker 1 and the smart speaker 2. For another example, when the bound devices are a smart television and a smart speaker, the master device may be set to the mobile phone, and the slave devices may be set to the smart television and the smart speaker. In this way, based on identifiers of the plurality of bound devices read in the NFC tag 701, the mobile phone may determine the specific master devices corresponding to content projection scenario that include the bound devices.

S1504: If the mobile phone A is the master device, the mobile phone sends projection content to each bound device according to a projection policy.

If the mobile phone A determines that the master device for this content projection is the mobile phone A (that is, the source device), the mobile phone A may serve as a control node for this content projection and send this projection content to each bound device (that is, the target device) in real time according to a specific projection policy. After receiving the projection content, each bound device starts to play or display the projection content. The projection policy may be preset by the user when the user binds the NFC tag 701, may be preset by the mobile phone based on information such as a device type or a device capability of a bound device, or may be dynamically generated after the mobile phone determines that the mobile phone is the master device. This is not limited in this embodiment of this application.

Figure 18:
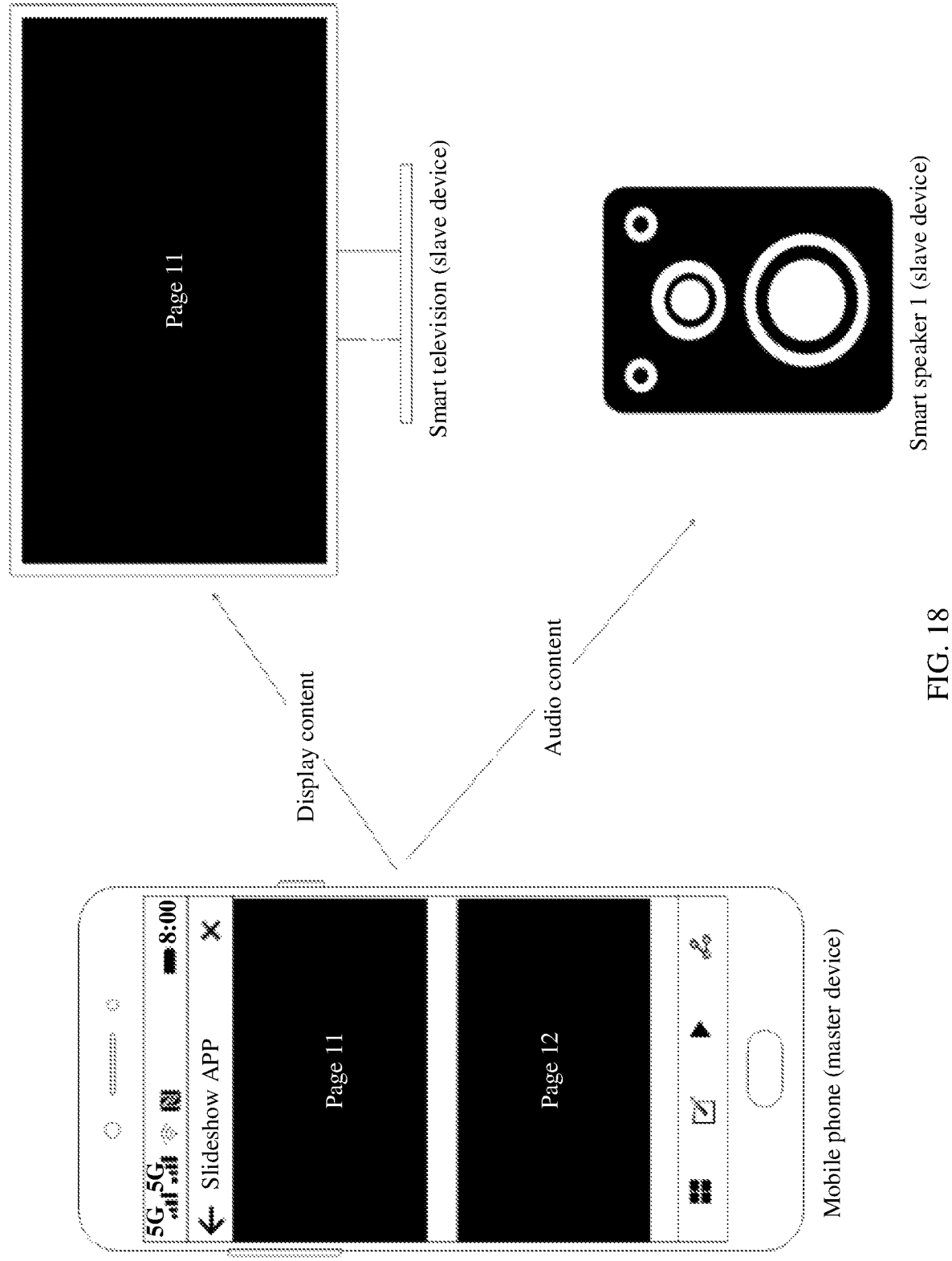
FIG. 18 is schematic diagram 11 of an application scenario of a cross-device content projection method according to an embodiment of this application.

For example, as shown in FIG. 18, when the bound devices of the NFC tag 701 are the smart television and the smart speaker 1, and the mobile phone A performs content projection to the smart television and the smart speaker 1, the mobile phone A may serve as the master device, and the smart television and the smart speaker 1 may serve as the slave devices of the mobile phone A. In this projection scenario, a projection policy may be set such that the smart television is used to play display content in the projection content, and the smart speaker 1 is used to play audio content in the projection content.

In this case, the mobile phone A may serve as the master device to send the display content in this projection content to the smart television, and the smart television starts to display the display content. At the same time, the mobile phone may send the audio content in this projection content to the smart speaker 1, and the smart speaker 1 starts to play the audio content.

Alternatively, the mobile phone A may serve as the master device to send the display content and the audio content in this projection content to the smart television, and the smart television plays the display content and the audio content. At the same time, the mobile phone A may send the audio content in this projection content to the smart speaker 1, and the smart speaker 1 starts to play the audio content. In other words, the smart television and the smart speaker 1 may simultaneously play the audio content projected this time. The foregoing smart television may include one or more smart televisions, and the foregoing smart speaker may include one or more smart speakers. This is not limited in this embodiment of this application.

Likewise, to ensure that the display content displayed by the smart television synchronizes with the audio content played by the smart speaker, the mobile phone may perform time synchronization with the smart television and the smart speaker before sending the display content and the audio content to the smart television and the smart speaker. Then, the mobile phone may send the display content and the audio content that include timestamps to the smart television and the smart speaker respectively, so that the smart television and the smart speaker can perform content projection synchronously according to the timestamps.

Alternatively, the projection policy used when the mobile phone performs content projection to the smart television and the smart speaker may be set dynamically. For example, the mobile phone may serve as the master device to obtain device capabilities of the smart television and the smart speaker. An example is used in which the smart television has displaying and audio playing capabilities, and the smart speaker has an audio playing capability. The mobile phone may dynamically determine to project the display content in this projection content to the smart television for displaying, and simultaneously project the audio content in this projection content to the smart television and the smart speaker for playing. Then, the mobile phone may serve as the master device to send the display content and the audio content in this projection content to the smart television, and send the audio content in this projection content to the smart speaker at the same time.

S1505: If the mobile phone A is not the master device, the mobile phone A sends projection content to the master device, and the master device controls, according to a projection policy, other bound devices to start this content projection.

If the mobile phone A determines that the master device for this content projection is one of the plurality of bound devices of the NFC tag 701, the mobile phone A may send this projection content to the master device. The master device controls, according to a specific projection policy, the other bound devices to start the content projection.

For example, when the bound devices of the NFC tag 701 are a smart television and a smart bulb, the smart television may serve as the master device for the content projection, and the smart bulb may serve as a slave device of the smart television. In this projection scenario, a projection policy may be set such that the smart television is used to display and play projection content, and the smart television controls lighting effects of the smart bulb.

In some other embodiments, when the mobile phone A learns, by reading the NFC tag 701, that there is a plurality of bound devices of the NFC tag 701, the mobile phone may determine by default that the mobile phone is the master device for this content projection. In this case, the mobile phone does not need to perform steps S1503 and S1505, and may send the projection content to each bound device according to the projection policy by using the related method in step S1504, to complete this content projection.

It can be learned that in the content projection method provided in this embodiment of this application, the user may conveniently and quickly project, by touching an NFC tag, projection content in the source device to a target device required by the user, implementing a "one-hop projection" function. In addition, the source device may simultaneously project the projection content to a plurality of target devices at a time. Through cooperation of the plurality of target devices, different projection effects are achieved in different projection scenarios, thereby improving user experience and working efficiency of collaboration between the plurality of devices.

S1506: The mobile phone A caches connection status information.

A screen projection status management module of the mobile phone A caches the connection status information of the mobile phone A. The connection status information includes target device information used in this content projection of the mobile phone A and verification information used in a process of connecting the mobile phone A and the target device. The target device information may be a device identifier, including a unique ID of a device, for example, content such as a MAC address of the device, an IMEI number of the device, or an IMSI number of a SIM card, or a temporary ID of a device. In some embodiments, a mobile phone B of another user performs a "one hop" operation with the mobile phone A to obtain the connection status information, which is described in detail in the following step.

In some other embodiments, after setting a bound device of the NFC tag 701 and a projection policy in a projection application of a mobile phone, a user may further share the NFC tag 701, the corresponding bound device, and the corresponding projection policy with another user. For example, a user A may share the NFC tag 701, a bound device, and a projection policy with a colleague of the user A in a manner such as WeChat. After receiving the shared content, a mobile phone of the user A's colleague may store a correspondence between the NFC tag 701, the bound device, and the projection policy. Later, when the user A's colleague makes the mobile phone touch the NFC tag 701, the mobile phone may also perform steps S1501 to S1505 to perform content projection to the corresponding bound device.

S1507: In response to the "one hop" operation of the mobile phone B with the mobile phone A, the mobile phone B obtains the connection status information cached in the mobile phone A.

Figure 19:
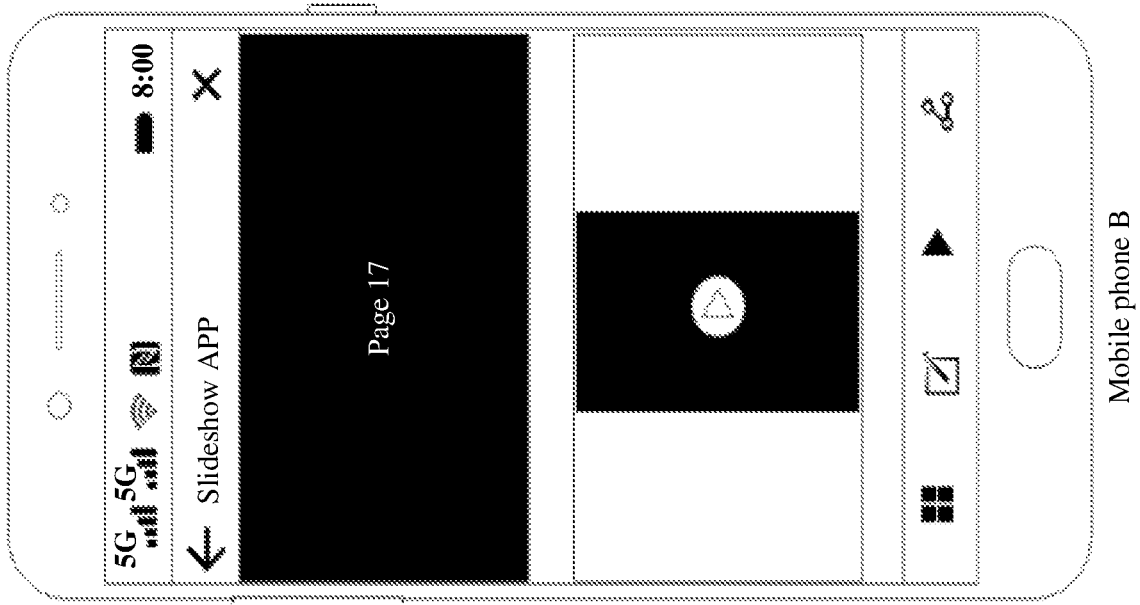
FIG. 19 is schematic diagram 12 of an application scenario of a cross-device content projection method according to an embodiment of this application.
Figure 19:
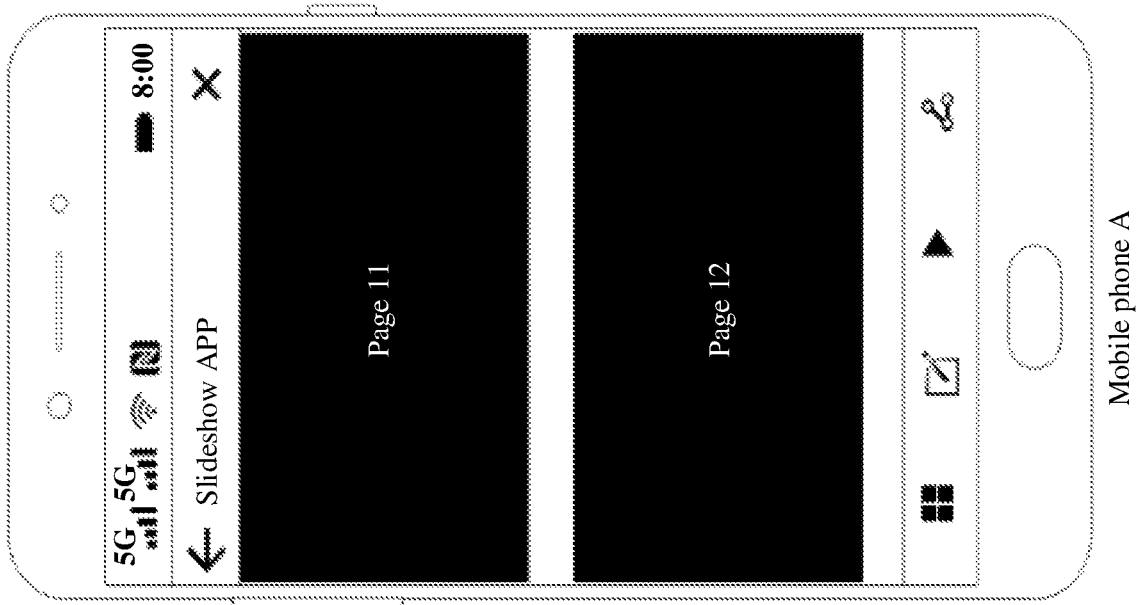

The user has projected content (such as display content and audio content) in the mobile phone A to the bound device of the NFC tag 701. For example, as shown in FIG. 17, the user has projected the slideshow A in the mobile phone A to the smart television. In this case, when another user expects to project content (such as display content and audio content) in the mobile phone B (that is, a source device) to the bound device of the NFC tag 701, as shown in FIG. 19, the another user may enable an NFC function of the mobile phone B, and make the mobile phone B touch (or approach) the mobile phone A, meaning performing a "one hop" operation of the mobile phone B with the mobile phone A.

For example, in response to the "one hop" operation of the mobile phone B with the mobile phone A, an NFC service of the mobile phone B provides a near field discovery function and sends a Bluetooth MAC address stored in an NFC tag of the mobile phone B to the mobile phone A. In response to the received Bluetooth MAC address, the mobile phone A sends a Bluetooth connection request to the mobile phone B. A Bluetooth connection is established between the mobile phone A and the mobile phone B after the mobile phone B accepts the Bluetooth connection request from the mobile phone A. The screen projection status management module of the mobile phone A pushes the cached connection status information to the mobile phone B by using Bluetooth. The mobile phone B obtains, based on the cached connection status information, the target device information and the verification information used in the content projection. The mobile phone B can establish a screen projection connection to the target device without being verified again. Optionally, the NFC service of the mobile phone B may report a projection event to a projection application, thereby triggering the projection application to send content being displayed or played by the mobile phone B as projection content to the target device and starting a content projection process.

In response to the "one hop" operation of the mobile phone B with the mobile phone A, the mobile phone B may read, from the mobile phone A, an identifier or identifiers of the one or more bound devices of the NFC tag 701. The bound device or bound devices may serve as a target device or target devices of the mobile phone B for this content projection. In other words, the "one hop" operation performed by the user to make a second source device touch a first source device that is in projection may trigger the second source device to learn the target device for this content projection, and thereby to automatically complete a subsequent content projection process with the target device. In this way, an operation procedure during content projection is simplified, and working efficiency of collaboration between a plurality of devices is improved.

In some possible implementations, the mobile phone A establishes a wired connection to the smart television, to project content in the mobile phone A to the smart television. Then, the NFC function of the mobile phone B is enabled, and an NFC chip of the mobile phone B is made touch (or approach) an NFC chip of the mobile phone A. After establishing the Bluetooth connection to the mobile phone A, as described above, the mobile phone B may receive, by using Bluetooth, the connection status information cached by the mobile phone A, or may directly receive the connection status information from the mobile phone A through the NFC chip.

In some other possible implementations, the mobile phone A establishes a wireless connection to the smart television, to project content in the mobile phone A to the smart television. The wireless connection may be the NFC connection as described above, or may be another wireless communication connection, such as Wi-Fi or Bluetooth. Then, the NFC function of the mobile phone B is enabled, and an NFC chip of the mobile phone B is made touch (or approach) an NFC chip of the mobile phone A. After establishing the Bluetooth connection to the mobile phone A, as described above, the mobile phone B may receive, by using Bluetooth, the connection status information cached by the mobile phone A, or may directly receive the connection status information from the mobile phone A through the NFC chip.

S1508: The mobile phone B provides collaboration options based on the obtained connection status information.

Figure 20:
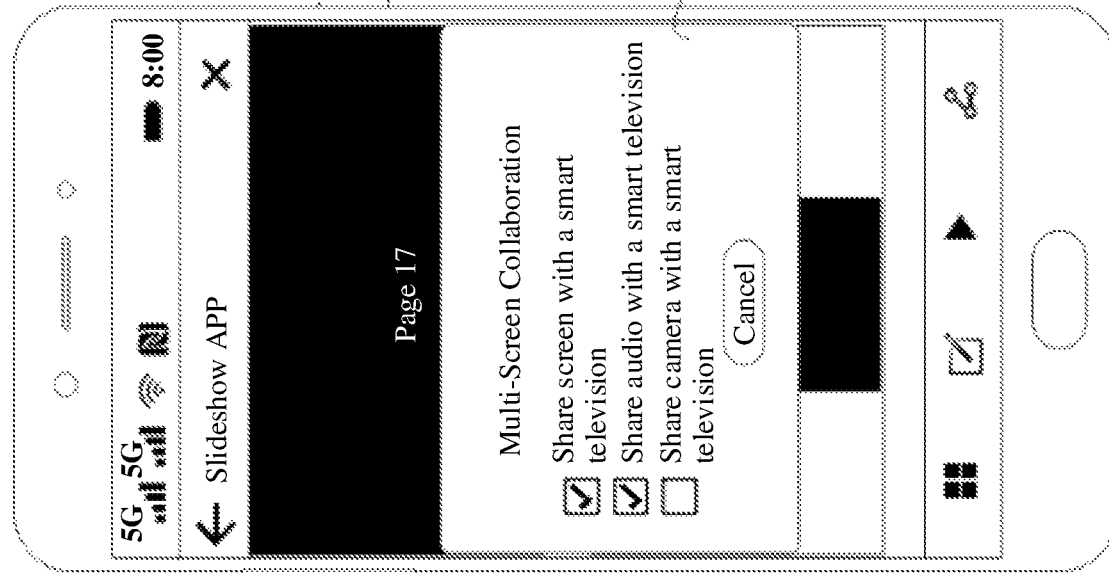
FIG. 20 is schematic diagram 13 of an application scenario of a cross-device content projection method according to an embodiment of this application.
Figure 20:
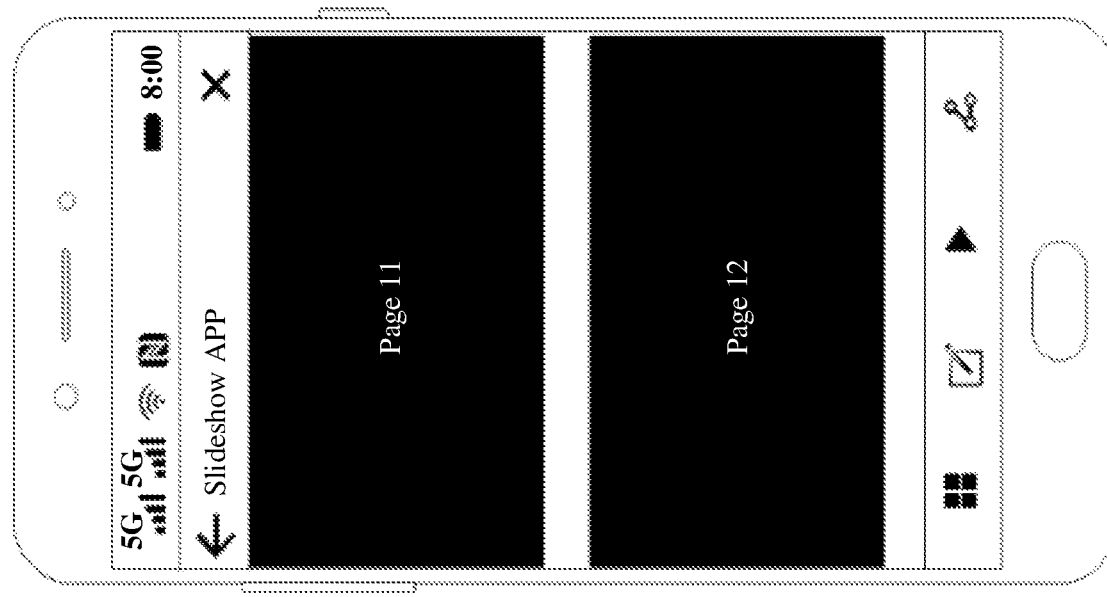

An example is used in which the user has projected the slideshow A in the mobile phone A to the smart television. The mobile phone B reads the identifier of the smart television from the mobile phone A through a "one hop" operation. The smart television may serve as a target device of the mobile phone B for this content projection. In a case that a plurality of source devices projects content to one target device, only one source device can use a peripheral device, such as a camera or a microphone, of the target device at a time. A screen of the target device can be simultaneously shared by the plurality of source devices. For example, as shown in FIG. 20, the user has projected the slideshow A in the mobile phone A to the smart television. Then, another user projects a slideshow B in the mobile phone B to the smart television. A collaboration setting interface 2001 is displayed on the mobile phone B. The collaboration setting interface 2001 provides the user with a plurality of collaboration options, including sharing a screen with a smart television, sharing audio with a smart television, sharing a camera with a smart television, and the like. For example, the user selects sharing a screen with a smart television and sharing audio with a smart television. Then, referring to FIGS. 21A, 21B, and 21C, the slideshow B in the mobile phone B is projected to the smart television, and video content in the slideshow B is also projected to the smart television for playing. At the same time, the slideshow A from the mobile phone A is also displayed side by side with the slideshow B on the smart television.

In some other embodiments, the first source device projects content to a plurality of target devices. The second source device has "one hop" of the first source device, and the user may also choose whether to project content in the second source device to one or more devices in the plurality of target devices. For example, as shown in FIG. 18, when the bound devices of the NFC tag 701 are the smart television and the smart speaker 1, and the mobile phone A performs content projection to the smart television and the smart speaker 1, the mobile phone A may serve as the master device, and the smart television and the smart speaker 1 may serve as the slave devices of the mobile phone A. In this projection scenario, a projection policy may be set such that the smart television is used to play display content in the projection content, and the smart speaker 1 is used to play audio content in the projection content.

Figure 22:
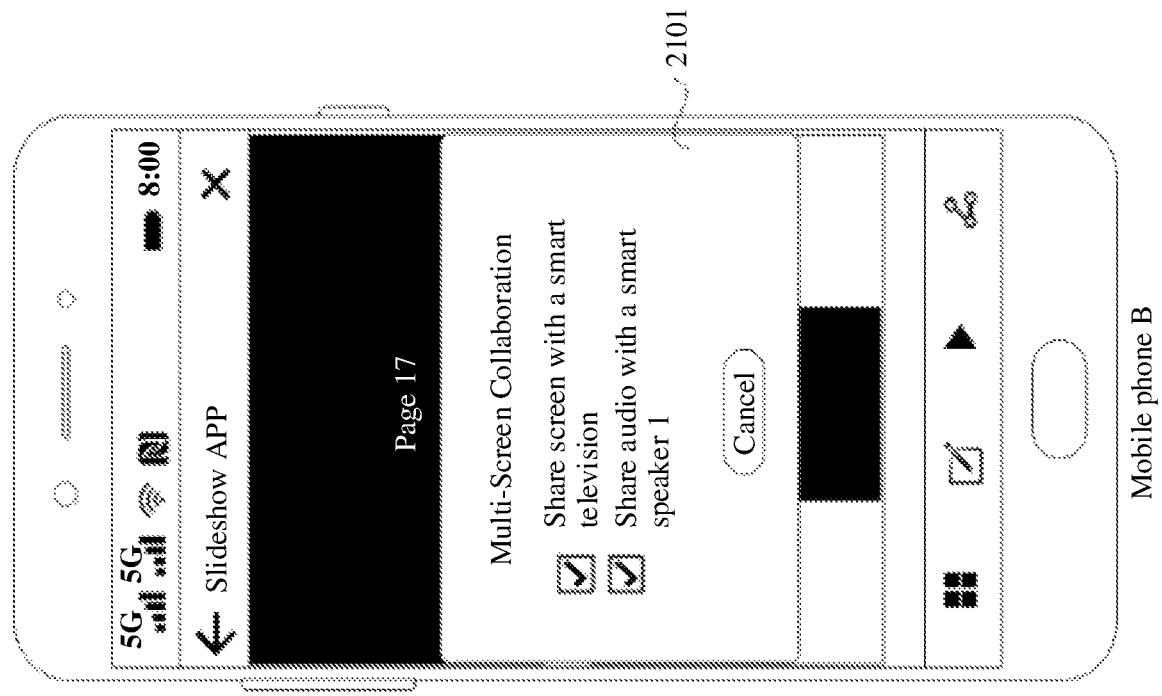
FIG. 22 is schematic diagram 15 of an application scenario of a cross-device content projection method according to an embodiment of this application.
Figure 22:
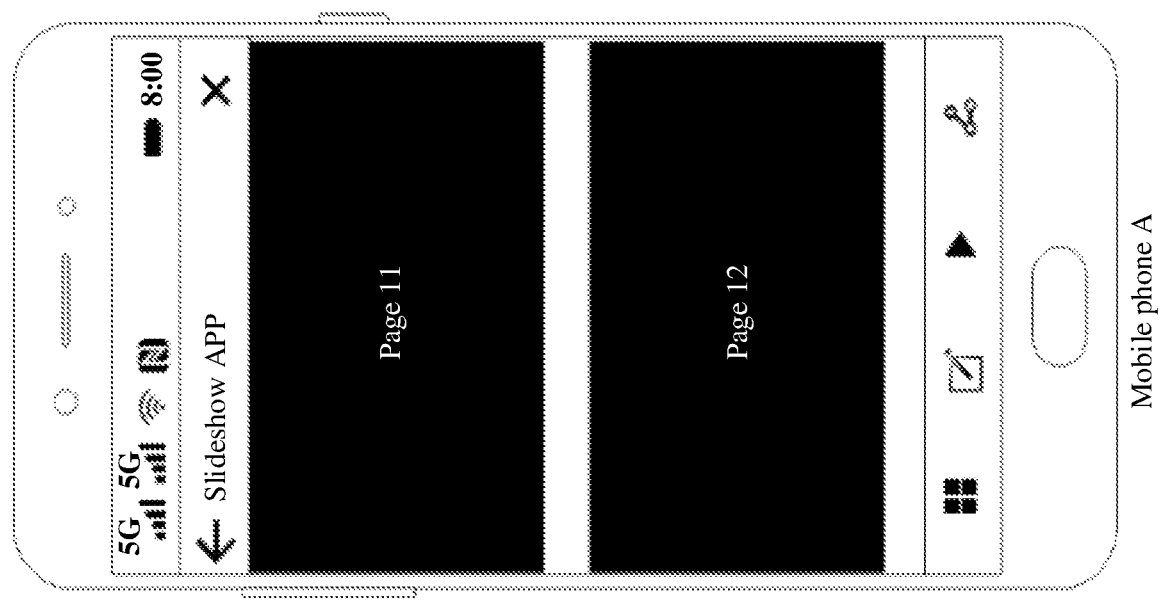
Figure 23A:
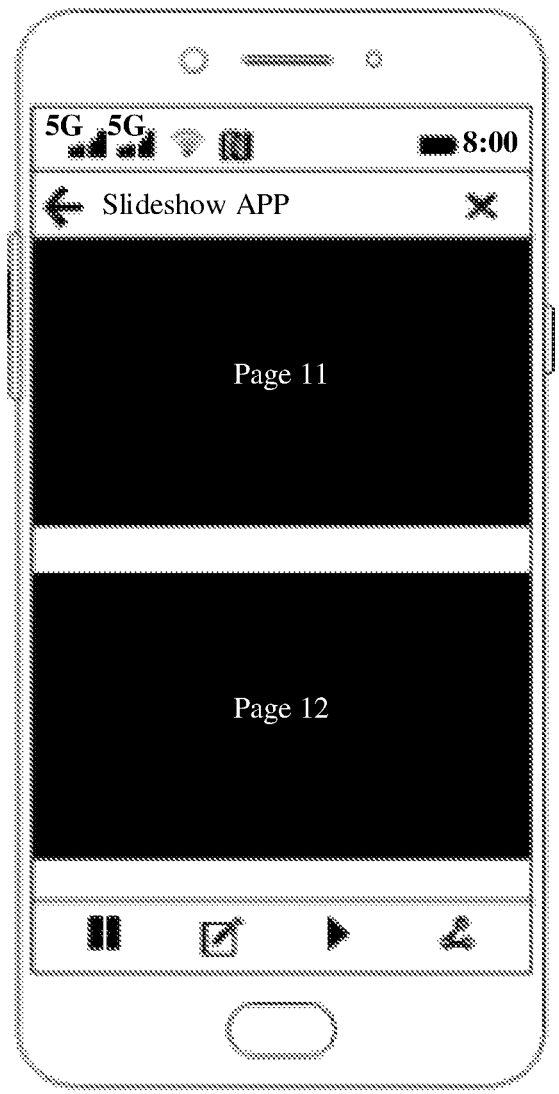
FIGS. 23A, 23B, and 23C are schematic diagram 16 of an application scenario of a cross-device content projection method according to an embodiment of this application.
Figure 23B:
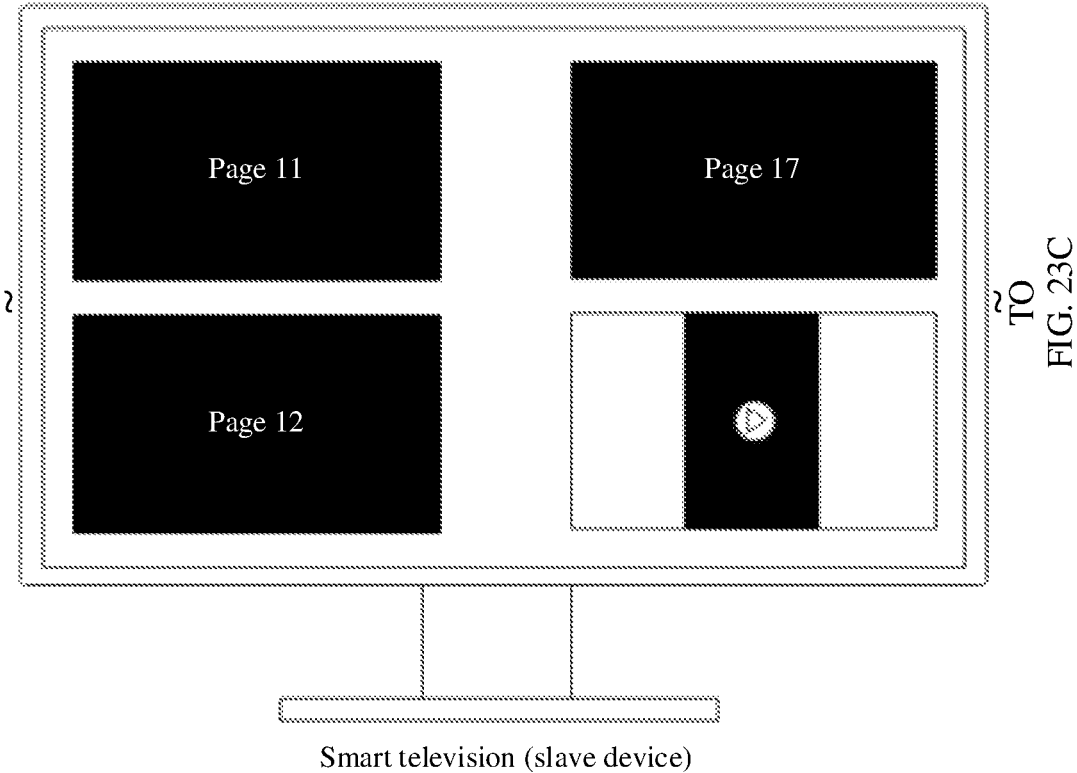
Figure 23B:
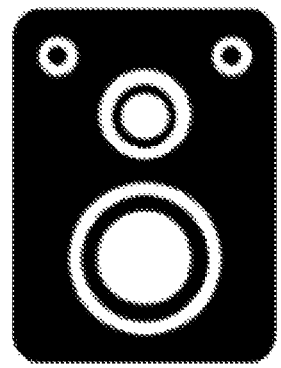
Figure 23C:
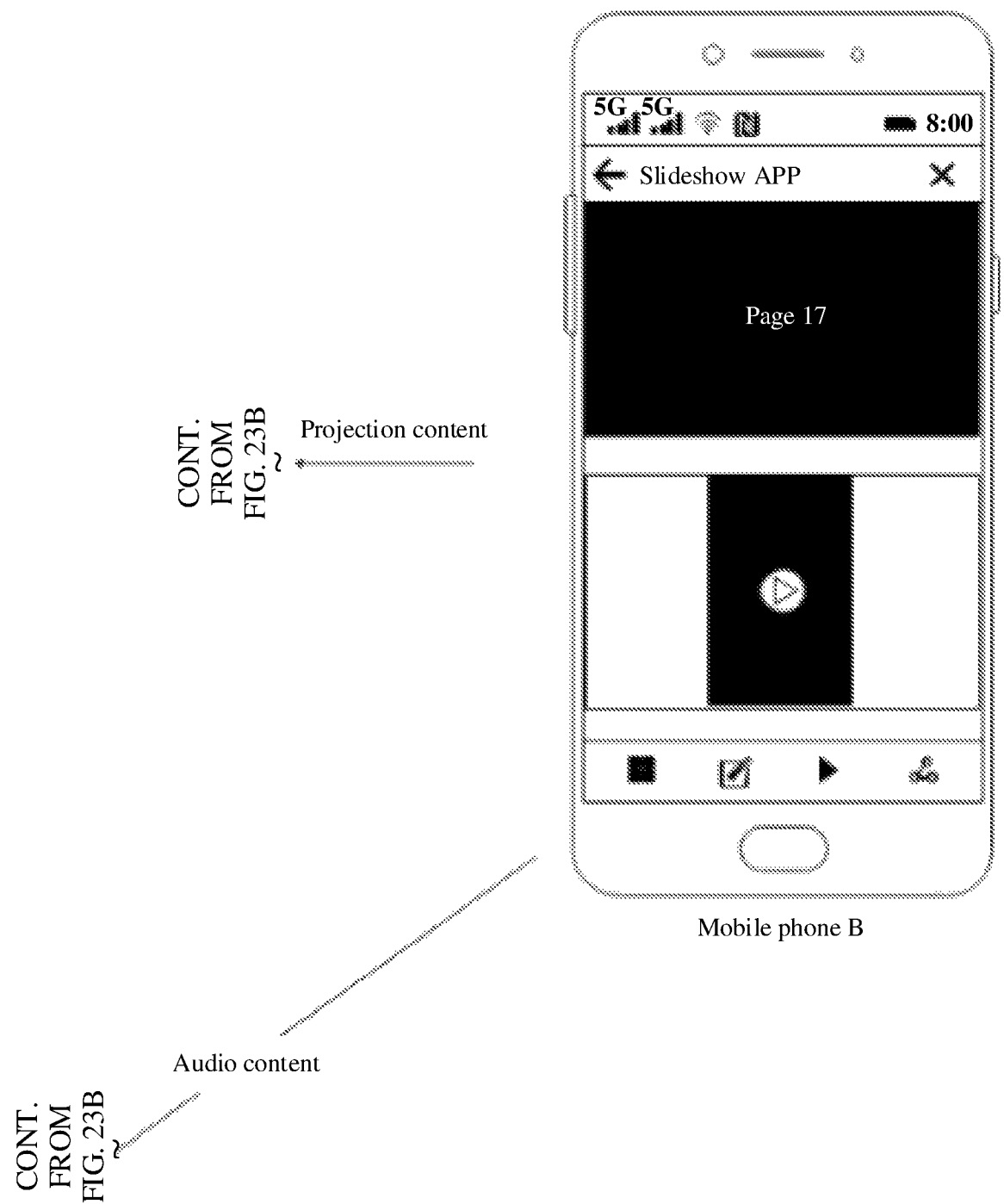

In this case, the mobile phone A may serve as the master device to send the display content in this projection content to the smart television, and the smart television starts to display the display content. At the same time, the mobile phone may send the audio content in this projection content to the smart speaker 1, and the smart speaker 1 starts to play the audio content. For example, as shown in FIG. 22, the user has projected the slideshow A in the mobile phone A to the smart television. Then, another user projects a slideshow B in the mobile phone B to the smart television. A collaboration setting interface 2101 is displayed on the mobile phone B. The collaboration setting interface 2101 provides the user with a plurality of collaboration options, including sharing a screen with a smart television and sharing audio with a smart speaker 1. For example, the user selects sharing a screen with a smart television and sharing audio with a smart speaker 1. Then, referring to FIGS. 23A, 23B, and 23C, the slideshow B in the mobile phone B is projected to the smart television, and video content in the slideshow B is projected to the smart speaker 1 for playing. At the same time, the slideshow A from the mobile phone A is also displayed side by side with the slideshow B on the smart television.

The second source device touching or approaching the first source device allows the second source device to quickly establish a connection to one or more target devices. Waiting time for the second source device to establish a wireless connection and find a target device is reduced, unintentional connections caused by accidental touches are also reduced, and operation accuracy is improved. In a multi-person conference scenario in which mobile phone screens need to be shared for comparing effects of different versions on different mobile phones, only one mobile phone needs to be connected to a television or a projector, and other mobile phones can also project content in the other mobile phones to the television or the projector simply through "one hop" of the mobile phone connected to the television or the projector. Content from a plurality of mobile phones can be simultaneously displayed on the television or the projector, which facilitates comparison and discussion, and improves working efficiency of conference participants.

S1509: The mobile phone B sends projection content to a bound device based on the user's selection of collaboration option, to start this content projection.

Figure 21A:
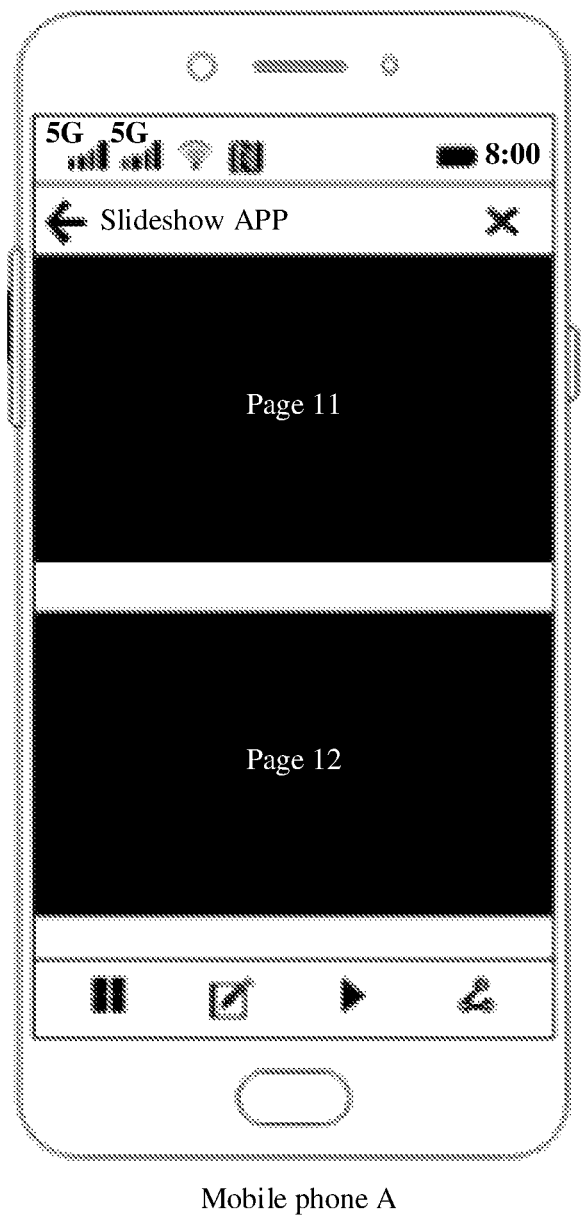
FIGS. 21A, 21B, and 21C are schematic diagram 14 of an application scenario of a cross-device content projection method according to an embodiment of this application.
Figure 21B:
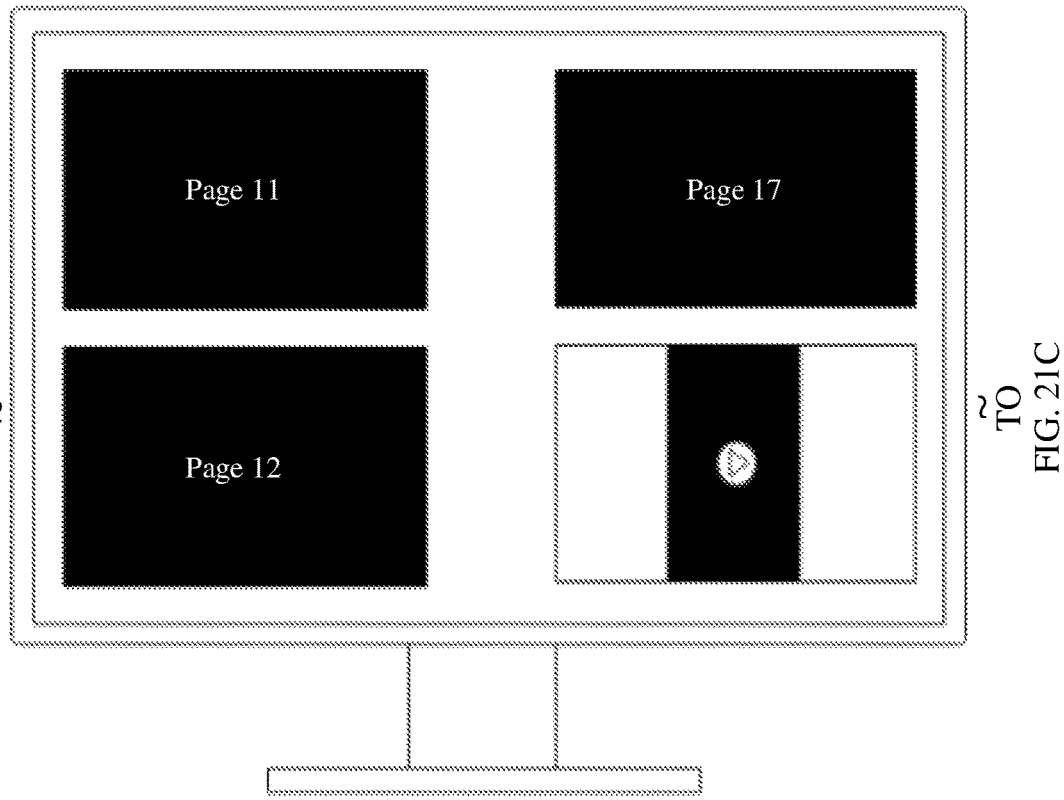
Figure 21C:
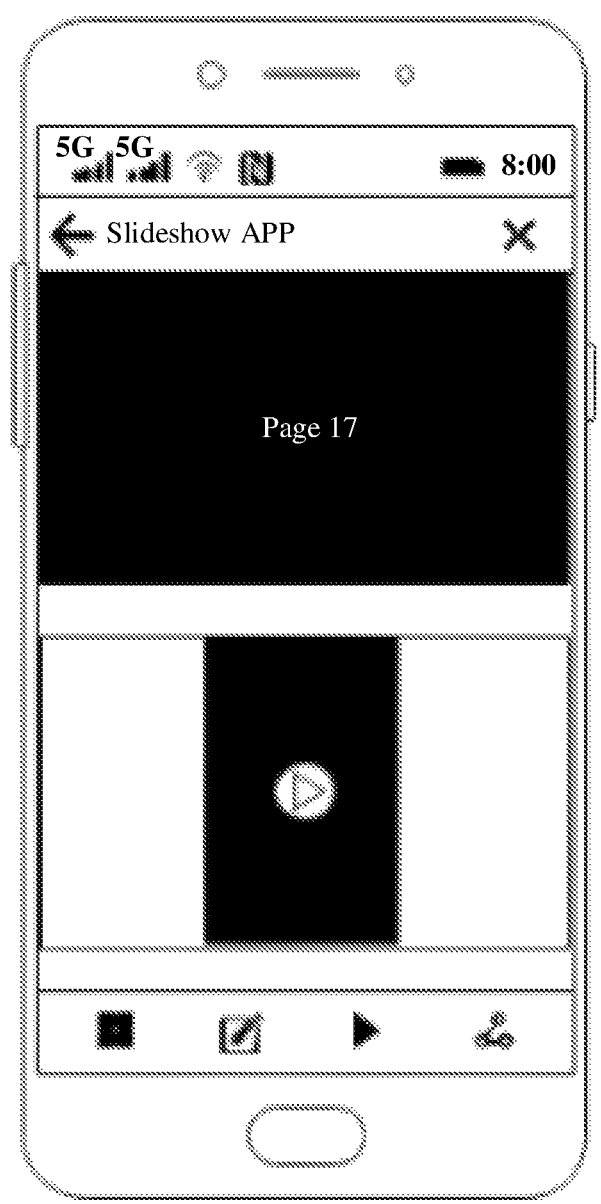

When or before sending the projection content, the mobile phone B sends the verification information and the projection content to the target device based on the obtained target device information, thereby initiating a connection request. After receiving the verification information, the target device automatically completes connection verification and displays the projection content from the mobile phone A and the projection content from the mobile phone B on different screens. An example is used in which the mobile phone A and the mobile phone B project content to the smart television. As shown in FIGS. 21A, 21B, and 21C, both the projection content from the mobile phone A and the projection content from the mobile phone B are displayed in portrait orientation on the smart television.

It can be understood that specifications of side-by-side displaying of the projection content from the mobile phone A and the projection content from the mobile phone B on the smart television may be: Both are displayed in portrait orientation; both are displayed in landscape orientation; or one is displayed in landscape orientation, and the other is displayed in portrait orientation. The foregoing displaying manner depends on a screen status of the source device. The target device enlarges content in equal proportion to content played by the source device, and then determines an appropriate layout based on a display scope of the target device.

For example, as shown in FIGS. 21A, 21B, and 21C, the projection content in the mobile phone A is PPT content played in portrait orientation, and the projection content in the mobile phone B is content, such as a video or PPT content, played in portrait orientation. When the content in the mobile phone A and the content in the mobile phone B are projected to the smart television, the PPT content played in portrait orientation in the mobile phone A is displayed in portrait orientation on a left half of a smart television screen, and the video or PPT content played in portrait orientation in the mobile phone B is displayed in portrait orientation on a right half of the smart television screen.

In a possible implementation, the projection content in the mobile phone A is video content played in landscape orientation, and the projection content in the mobile phone B is document content played in portrait orientation. When the content in the mobile phone A and the content in the mobile phone B are projected to the smart television, the video content played by the mobile phone A is displayed in landscape orientation on the left half of the smart television screen, and the document content played by the mobile phone B is displayed in portrait orientation on the right half of the smart television screen.

In another possible implementation, the projection content in the mobile phone A is video content played in landscape orientation, and the projection content in the mobile phone B is also video content played in landscape orientation. When the content in the mobile phone A and the content in the mobile phone B are projected to the smart television, the video content played by the mobile phone A is displayed in landscape orientation on the left half of the smart television screen, and the video content played by the mobile phone B is displayed in landscape orientation on the right half of the smart television screen.

It can be understood that, to implement the foregoing functions, corresponding hardware structures and/or software modules for performing the functions are included in the electronic devices. Persons skilled in the art should easily be aware that, in combination of the algorithm steps in the examples described in the embodiments disclosed in this specification, this application can be implemented by hardware or a combination of hardware and computer software. Whether a specific function is performed by hardware or by computer software-driven hardware depends on particular applications and design constraint conditions of the technical solutions. Persons skilled in the art may use a different method to implement the described functions for each particular application, but it should not be considered that the implementation goes beyond the scope of this application.

In the embodiments of this application, the electronic device may be divided into functional modules based on the foregoing method examples, for example, divided into functional modules in correspondence to functions, or integrating two or more functions into one processing module. The integrated module may be implemented in a form of hardware, or may be implemented in a form of a software functional module. It should be noted that division into the modules in the embodiments of this application is an example for illustration, which is merely division according to logical functions, and may be other division in actual implementation.

An embodiment of this application discloses an electronic device, including a processor, a memory that is connected to the processor, an input device, and an output device. The input device and the output device may be integrated into one device. For example, a touch sensor may be used as the input device, a display may be used as the output device, and the touch sensor and the display are integrated into a touchscreen.

Figure 24:
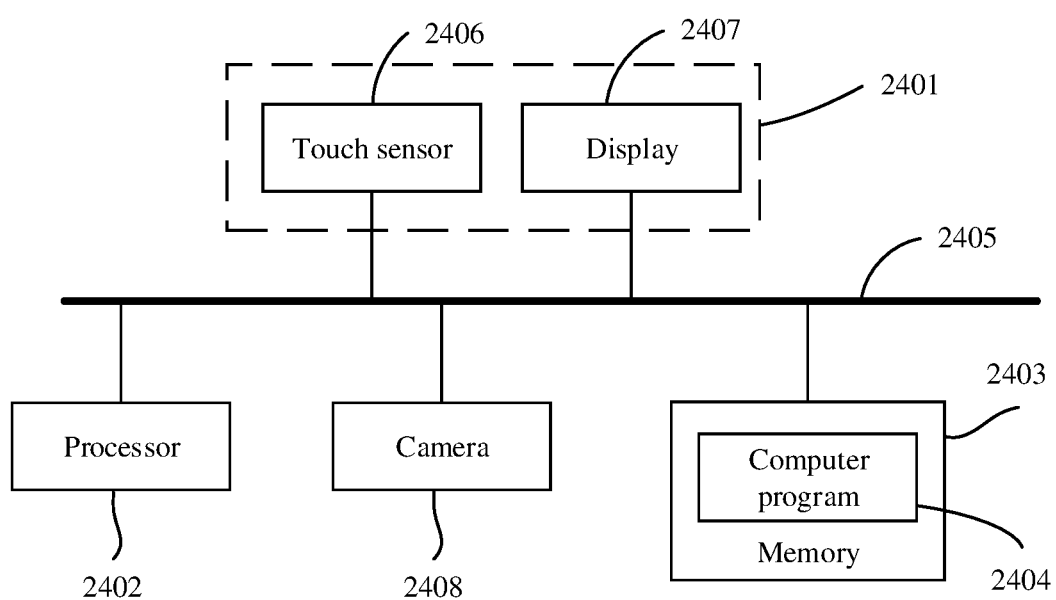
FIG. 24 is schematic structural diagram 2 of an electronic device according to an embodiment of this application.

In this case, as shown in FIG. 24, the electronic device may include a touchscreen 2401, where the touchscreen 2401 includes a touch sensor 2406 and a display 2407, one or more processors 2402, one or more cameras 2408, a memory 2403, one or more application programs (not shown), and one or more computer programs 2404. The foregoing devices may be connected by using one or more communications buses 2405. The one or more computer programs 2404 are stored in the memory 2403 and are configured to be executed by the one or more processors 2402. The one or more computer programs 2404 include instructions, and the instructions may be used to perform the steps in the foregoing embodiments. All related content of the steps in the foregoing method embodiments may be cited in function descriptions of corresponding physical devices, and details are not described herein again.

For example, the processor 2402 may be specifically the processor 110 shown in FIG. 5, the memory 2403 may be specifically the internal memory 116 and/or the external memory 120 shown in FIG. 5, the camera 1308 may be specifically the camera 193 shown in FIG. 5, the display 2407 may be specifically the display 194 shown in FIG. 5, and the touch sensor 2406 may be specifically the touch sensor 180K in the sensor module 180 shown in FIG. 5. This is not limited in this embodiment of this application.

An embodiment of this application further provides a computer storage medium. The computer storage medium stores computer instructions. When the computer instructions are run on an electronic device, the electronic device performs the foregoing related method steps to implement the method in the foregoing embodiments.

An embodiment of this application further provides a computer program product. When the computer program product is run on a computer, the computer is caused to perform the foregoing related method steps to implement the method in the foregoing embodiments.

In addition, an embodiment of this application further provides an apparatus. The apparatus may be specifically a chip, a component, or a module, and the apparatus may include a processor and a memory that are connected to each other. The memory is configured to store computer executable instructions. When the apparatus is running, the processor may execute the computer executable instructions stored in the memory, so that the chip performs the shooting method in the foregoing method embodiments.

The electronic device, the computer storage medium, the computer program product, or the chip provided in the embodiments of this application is configured to perform the corresponding method provided above. Therefore, for beneficial effects that can be achieved by the electronic device, the computer storage medium, the computer program product, or the chip, refer to the beneficial effects in the corresponding method provided above. Details are not described herein again.

Based on the description of the foregoing embodiments, persons skilled in the art may understand that, for convenience and brevity of description, division into the foregoing functional modules is merely an example for illustration. In actual application, the foregoing functions may be allocated to different functional modules and implemented as required. That is, an inner structure of an apparatus is divided into different functional modules to implement all or some of the functions described above.

In the several embodiments provided in this application, it should be understood that the disclosed apparatus and method may be implemented in other manners. For example, the apparatus embodiment described above is merely an example for illustration. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate, and parts displayed as units may be one or more physical units, and may be located in one place or distributed in different places. Some or all of the units may be selected based on an actual requirement to achieve objectives of the solutions of the embodiments.

In addition, functional units in the embodiments of this application may be integrated into one processing unit, or each of units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the method described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A cross-device content projection method that is applied to a first electronic device, a second electronic device, and a third electronic device, wherein the first electronic device and the third electronic device each have a respective near field communication (NFC) chip, the first electronic device plays first content, the third electronic device plays second content, and the method comprises:
reading, by the first electronic device and from an NFC tag bound to the second electronic device, a binding relationship associated with the second electronic device;
establishing, by the first electronic device with the second electronic device, a connection with the second electronic device for projecting the first content to the second electronic device, wherein the connection between the first electronic device and the second electronic device is associated with connection status information;
projecting, by the first electronic device, the first content to the second electronic device;
displaying, by the second electronic device, the first content;
touching or approaching, by an NFC chip of the third electronic device, an NFC chip of the first electronic device, wherein the third electronic device is separate from and not bound to the NFC tag;
sending, by the first electronic device, the connection status information of the first electronic device to the third electronic device to allow the third electronic device to project the second content to the second electronic device;

receiving, by the third electronic device, the connection status information from the first electronic device and without interacting with the NFC tag;

projecting, by the third electronic device, the second content to the second electronic device based on the connection status information received from the first electronic device; and displaying, by the second electronic device, the first content and the second content.

2. The content projection method according to claim 1, wherein:

after the NFC chip of the third electronic device touches or approaches the NFC chip of the first electronic device, the method further comprises:

receiving, by the third electronic device, a Bluetooth media access control (MAC) address of the first electronic device through the NFC chip of the third electronic device; and establishing, by the third electronic device, a Bluetooth connection to the first electronic device based on the Bluetooth MAC address; and wherein sending, by the first electronic device, the connection status information of the first electronic device to the third electronic device comprises:

sending, by the first electronic device, the connection status information of the first electronic device to the third electronic device by using the Bluetooth connection.

3. The content projection method according to claim 1, wherein sending, by the first electronic device, the connection status information of the first electronic device to the third electronic device and receiving, by the third electronic device, the connection status information comprises:

sending, by the first electronic device, the connection status information of the first electronic device to the third electronic device through the NFC chip of the first electronic device; and receiving, by the third electronic device, the connection status information of the first electronic device through the NFC chip of the third electronic device.

4. The content projection method according to claim 1, wherein projecting, by the third electronic device, the second content to the second electronic device based on the connection status information comprises:

displaying, by the third electronic device, prompt information based on the connection status information, wherein the prompt information is used to provide an option for determining a projection policy;

receiving, by the third electronic device, an input operation performed on the prompt information; and in response to the input operation, projecting, by the third electronic device, the second content to the second electronic device according to the projection policy determined by a user.

5. The content projection method according to claim 4, wherein:

the second electronic device comprises a television, and projecting, by the third electronic device, the second content to the second electronic device according to the projection policy determined by the user comprises:

projecting, by the third electronic device, display content and/or audio content in the second content to the television.

6. The content projection method according to claim 4, wherein the second electronic device comprises a television and a speaker, and projecting, by the third electronic device, the second content to the second electronic device according to the projection policy determined by the user comprises:

projecting, by the third electronic device, display content in the second content to the television; and projecting, by the third electronic device, audio content in the second content to the speaker.

7. The content projection method according to claim 1, wherein the connection status information comprises information about the second electronic device.

8. The content projection method according to claim 7, wherein the connection status information further comprises verification information used for the first electronic device to project the first content to the second electronic device.

9. A content projection method that is applied to a third electronic device, wherein the third electronic device has a near field communication (NFC) chip, and the method comprises:

playing, by the third electronic device, second content;

touching or approaching, by the NFC chip of the third electronic device, an NFC chip of a first electronic device, wherein the first electronic device is a device that has established a screen projection connection to a second electronic device based on reading, from an NFC tag bound to the second electronic device that is separate from the third electronic device, a binding relationship associated with the second electronic device;

receiving, by the third electronic device, connection status information sent by the first electronic device, wherein the connection status information corresponds to the screen projection connection established by the first electronic device with the second electronic device; and projecting, by the third electronic device, the second content to the second electronic device based on the connection status information.

10. The content projection method according to claim 9, wherein:

after the NFC chip of the third electronic device touches or approaches the NFC chip of the first electronic device, the method further comprises:

receiving, by the third electronic device, a Bluetooth media access control (MAC) address of the first electronic device through the NFC chip of the third electronic device;

establishing, by the third electronic device, a Bluetooth connection to the first electronic device based on the Bluetooth MAC address; and wherein receiving, by the third electronic device, the connection status information sent by the first electronic device comprises:

receiving, by the third electronic device through the Bluetooth connection, the connection status information sent by the first electronic device.

11. The content projection method according to claim 9, wherein receiving, by the third electronic device, the connection status information sent by the first electronic device comprises:

receiving, by the third electronic device through the NFC chip of the third electronic device, the connection status information sent by the first electronic device.

12. The content projection method according to claim 9, wherein projecting, by the third electronic device, the second content to the second electronic device based on the connection status information comprises:

displaying, by the third electronic device, prompt information based on the connection status information, wherein the prompt information is used to provide an option for determining a projection policy;

receiving, by the third electronic device, an input operation performed on the prompt information; and in response to the input operation, projecting, by the third electronic device, the second content to the second electronic device according to the projection policy determined by a user.

13. The content projection method according to claim 12, wherein the second electronic device comprises a television, and projecting, by the third electronic device, the second content to the second electronic device according to the projection policy determined by the user comprises:

projecting, by the third electronic device, display content or audio content in the second content to the television.

14. The content projection method according to claim 12, wherein the second electronic device comprises a television and a speaker, and projecting, by the third electronic device, the second content to the second electronic device according to the projection policy determined by the user comprises:

projecting, by the third electronic device, display content in the second content to the television; and projecting, by the third electronic device, audio content in the second content to the speaker.

15. The content projection method according to claim 9, wherein the connection status information comprises information about the second electronic device.

16. The content projection method according to claim 15, wherein the connection status information further comprises verification information used for the first electronic device to project first content to the second electronic device.

17. An electronic device, comprising one or more processors and a memory, wherein code is stored in the memory, and when the code is executed by the electronic device, the electronic device is caused to perform the following steps:

playing, by a third electronic device, second content;

touching or approaching, by a near field communication (NFC) chip of the third electronic device, an NFC chip of a first electronic device, wherein the first electronic device is a device that has established a screen projection connection to a second electronic device based on reading, from an NFC tag bound to the second electronic device that is separate from the third electronic device, a binding relationship associated with the second electronic device;

receiving, by the third electronic device, connection status information sent by the first electronic device, wherein the connection status information corresponds to the screen projection connection established by the first electronic device with the second electronic device; and projecting, by the third electronic device, the second content to the second electronic device based on the connection status information.

\* \* \* \* \*